(12) United States Patent
Anderson et al.

(10) Patent No.: US 11,426,871 B1
(45) Date of Patent: Aug. 30, 2022

(54) AUTOMATED ROBOTIC FLOOR MAP GENERATION

(71) Applicant: Amazon Technologies, Inc., Seattle, WA (US)

(72) Inventors: Eric D. Anderson, Stow, MA (US); Anthony Barone, Wakefield, MA (US); James Fleming, Arlington, MA (US); Wuwei Liang, Hopkinton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 16/890,893

(22) Filed: Jun. 2, 2020

(51) Int. Cl.
*G06Q 10/08* (2012.01)
*B25J 9/16* (2006.01)
*G05D 1/02* (2020.01)

(52) U.S. Cl.
CPC .......... *B25J 9/1664* (2013.01); *G05D 1/0212* (2013.01)

(58) Field of Classification Search
CPC . B25J 9/163; B25J 9/1656; B25J 9/162; B25J 5/00; G06Q 10/06313; G06Q 10/08; G06Q 10/0637; G06Q 10/087; G06Q 10/0631; G06Q 50/28
USPC ......... 700/245, 255, 248; 73/178 R; 705/1.1, 705/7.23
See application file for complete search history.

(56) References Cited

U.S. PATENT DOCUMENTS

| | | | |
|---|---|---|---|
| 2018/0180421 A1* | 6/2018 | Holz | G01S 17/88 |
| 2018/0306589 A1* | 10/2018 | Holz | G05D 1/0236 |
| 2019/0286921 A1* | 9/2019 | Liang | G06F 16/587 |
| 2019/0303857 A1* | 10/2019 | Lecue | G06Q 10/08355 |
| 2019/0354708 A1* | 11/2019 | Fisher | G06F 16/221 |
| 2021/0347382 A1* | 11/2021 | Huang | G05D 1/024 |

* cited by examiner

*Primary Examiner* — Dalena Tran
(74) *Attorney, Agent, or Firm* — Lee & Hayes, P.C.

(57) ABSTRACT

A system can be configured to generate and analyze one or more candidate logistics maps based on a set of input parameters and a baseline map of a logistics facility. The system can identify modifications strategies, resource limits, regions of interest, mapping constraints through analysis of the input parameters and the baseline map. The generated candidate maps and the baseline map can be implemented in virtual environments that are configured to replicate one or more operations associated with the baseline map, such as item distribution, item retrieval, and reorganization operations. The virtual environment can further simulate the resource limits associated with the baseline map and compare performance indicators from simulation of the baseline map to performance indicators from simulation of the candidate maps to identify viable improvements over existing logistics solutions.

20 Claims, 7 Drawing Sheets

AUTOMATED ROBOTIC FLOOR MAP GENERATION

BACKGROUND

Presently, logistics facilities and other operations are manually designed to utilize allocated resources and space to effectively store, route, deliver, and otherwise manipulate goods within the logistics facilities and operations. However, manual design of large area and high throughput systems generally incorporates design decisions that are difficult to fully qualify before implementation in a final design due to the large variable space associated with the systems. Accordingly, manually designed logistics facilities and operations can incorporate numerous errors and inefficient design decisions due to the practical limitations of manual efforts. In particular, there is a need for the capability to rapidly produce, verify, test, and iterate on design decisions associated with large scale design operations to effectively utilize available resources. Additionally, manual design cannot effectively analyze the variable space associated with logistics systems and cannot effectively deploy the analysis to fully utilize allocated resources. Accordingly, effective analysis and utilization of the variable space associated with logistics system design can more effectively leverage the available resources and the implementation of systems that minimize processing times and optimize the throughput of a logistics network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
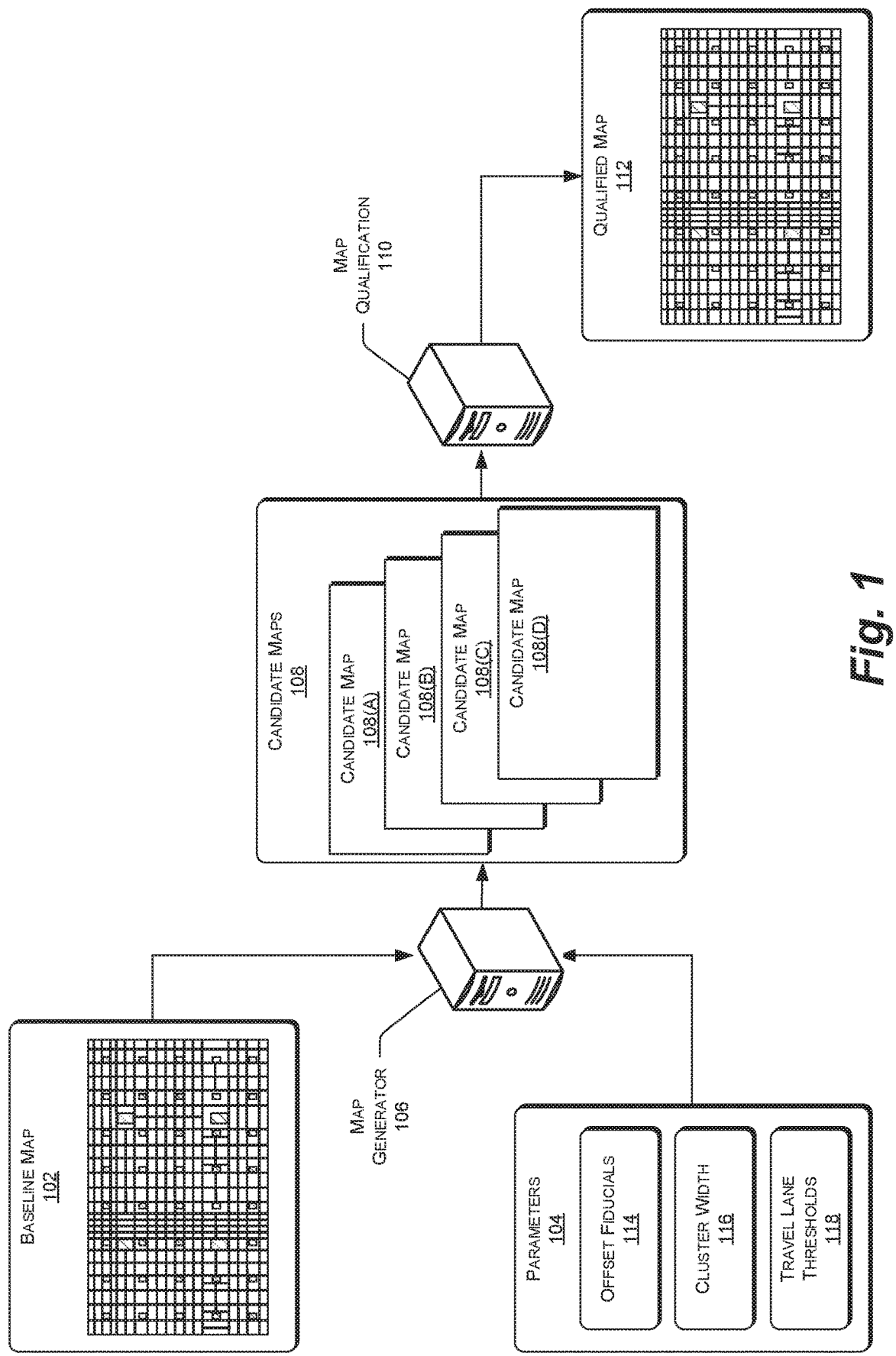
FIG. 1 illustrates an example method for generating a plurality of candidate maps from a baseline map and one or more input parameters and selecting a qualified map.

Described herein are systems, methods, and/or processes for generating one or more candidate maps and selecting a qualified map from the one or more candidate maps that optimizes storage of and/or extraction of items for a storage facility. In some embodiments, the described systems, methods, and/or processes can receive a baseline map that represents an existing floorplan within a storage facility and one or more parameters that indicates features and/or variables of candidate map generation that are to be utilized and/or disregarded. In particular, and as a part of the described systems and/or methods, a map generation engine can receive the baseline map and the one or more parameters and produce one or more candidate maps. The candidate maps can be produced to increase total storage space within the storage facility, optimize the positioning of travel lanes within the storage facility, optimize the storage locations within the storage facility, and otherwise improve operations that occur within the storage facility. Once the one or more candidate maps are produced by the map generator, the one or more candidate maps can be simulated and qualified to determine whether they satisfy the targeted performance threshold/objective associated with the parameters provided to the map generator. It should be noted that the described systems and methods can be utilized to design more than qualified maps for travel lane placement within a storage facility. In general, the described systems and methods can receive baseline maps, timetables, logistics data, and related information associated with a logistics operation. Additionally, modification parameters can be utilized by the described systems and methods to produce optimized maps and/or logistics flows that improve performance of logistics operations, such as item delivery, automated resource management, item storage and distribution, and scheduling of resource utilization. Accordingly, the described systems and methods can receive provided input including targeted parameters and baseline data, generate one or more candidate solutions, and simulate implementation of the one or more candidate solutions to determine whether provided thresholds are satisfied by the one or more candidate solutions.

In some embodiments, the described systems and methods can include a map generator and a map qualification system. As described above, the map generator can receive a baseline map of a logistics facility and one or more parameters that define modifications to be made to the baseline maps and modification objectives representing improvements to the baseline map that are to be satisfied by candidate maps produced by the map generator. Additionally, the map qualification system can include a simulation engine that receives a candidate map from the map generator and determines how the candidate map would modify the current throughput of the logistics facility. In at least one embodiment, the map qualification system can simulate both the baseline map and the candidate map, compare one or more performance indicators (i.e., storage density, average item transit time, etc.), and determine performance improvements and costs associated with the candidate map in comparison to the baseline map. Further, the described systems and methods can output a data summary that indicates qualified maps that satisfy the modification objectives received by the map generation and the qualification tool and how the qualified maps performed within one or more simulations executed by the qualified tool.

In some embodiments, the baseline map represents an existing layout of a logistics facility or a material handling facility. The logistics facility/material handling facility can be a storage warehouse, a delivery warehouse, a transportation facility, a shipping depot, or other facility where large volumes of transactions require the movement of goods and/or vehicles from one or more first locations, through the logistics facility or to the logistics facility, and delivery of the goods or movement of the vehicles to one or more second locations. Alternatively, the baseline map can be a different baseline representation of logistics operations such as unloading and/or delivery timetables, delivery location assignment, item routing data, and other previously established datasets. In general, the baseline map represents an established layout or assignment of logistic functions and/or resources within a logistics facility (i.e., warehouse, depot, etc.) and/or operation (i.e., delivery operation, management of automated vehicle network, etc.). Further, the baseline map can provide information that describes structural obstacles, organizational obstacles, one or more floorplans that exist within the logistics facility, and a current allocation of resources and space. In at least one embodiment, the baseline map can be a literal map that depicts a floorplan inside a warehouse, an organizational system that includes a plurality of storage locations, transport lanes serving the organizational system, and structural features such as support pillars, stairwells, and emergency areas.

In some embodiments, one or more parameters can represent the operation variables that can be modified by the described methods and/or systems. Additionally, the one or more parameters can define the objectives that are to be satisfied by the map generator while producing the one or more candidate maps and that are tested by the qualification tool when identifying qualified maps from the one or more candidate maps. Further, the one or more parameters can identify zones/areas of the baseline map that are to be modified, starting points for the modification of the baseline map, the number of travel lanes for an orientation or direction, define non-linear travel lanes, strategies for deciding travel lane directions, maximum depth of storage locations, strategies for placing travel lanes and other information for generating the candidate maps. The one or more parameters can be provided to the map generator as single values, ranges of values, or modifications that cause the map generator to utilize different strategies in the generation of the candidate maps. The one or more parameters can be provided to the map generator simultaneously, sequentially, randomly, or in other arrangements to modify how the candidate maps are altered in light of the one or more parameters.

In some embodiments, a map generator can receive a baseline map and one or more parameters to produce one or more candidate maps. As noted above, the baseline map describes the logistics facility based on the current organization and operations that occur within the logistics facility. Additionally, the one or more parameters describe how the baseline map can be modified and what the objectives for the modifications are. Accordingly, the map generator can perform a variety of modifications to the baseline map. Alternatively, the map generator can acquire information about the logistics facility and implement new organization frameworks and operations within the logistics facility based on the one or more parameters. In general, the map generate can operate to transform individual portions of the map such as deep storage locations, transfer lane highways, perimeter zones, and/or expansion joint zones based on the variables provided via the one or more parameters.

In some embodiments, the map generator can utilize a grid of cells to produce one or more candidate maps from the baseline map and the one or more parameters. In particular, the map generator can generate a grid of cells that encompasses the logistics facility represented within the baseline map. The grid of cells can be configured such that individual cells represent storage locations, storage clusters, zones bounded by travel lanes, or other organization strategies for identifying locations and describing the intended function(s) of those locations. While the cells can be uniformly distributed and/or have a uniform size, the cells can be configured to have variable dimensions within the grid. Additionally, the cells can be arranged in rows, columns, and other organizational structures such that locations within the logistics facility described by the baseline map are systematically mapped to the grid of cells and identifiable via the grid of cells. Further, the individual cells can represent an area within the physical logistics facility in a virtual environment and indicate what actions can be taken within the area and how the area is to be utilized (i.e., identifying an area as a storage location or a part of a travel lane).

In at least one embodiment, the individual cells can represent fiducials within the logistics facility. Individual fiducials can be identified by physical markers and/or other indicators that are arranged in a grid on a floor of the logistics facility. Additionally, the fiducials can represent an area within the logistics facility and describe how the space can be utilized (i.e., a fiducial can be configured as a storage fiducial, a travel lane fiducial, or other type of fiducial and indicate how the space associated with the marker and/or indicator is to be utilized). The physical marker can be an indicator such as a barcode, a QR code, or other indicator that identifies an area within the logistics facility and informs robotic drives and other entities (i.e., other automated vehicles, logistics facility workers, etc.) what actions can be performed, or are intended to be performed, within the area associated with the fiducial.

In some embodiments, a map qualification system can receive the one or more candidate maps from the map generator and determine whether the map satisfies one or more performance thresholds that include increases in storage density, reduction of transportation time, reduction of lost or damaged goods, and other logistics performance indicators. Additionally, the map qualification system can identify tradeoffs between the individual performance indicators and determine efficiencies associated with candidate maps that provide larger benefits for one or more performance indicators at smaller costs for one or more additional performance indicators. Accordingly, the map qualification system can operate to identify candidate maps that satisfy one or more performance thresholds and can indicate one or more costs that negatively affect the operations of the logistics facility that are associated with the candidate maps. Further, the map qualification system can output the candidate maps satisfying the one or more performance thresholds as qualified maps that can be implemented for the logistics facility.

In some embodiments, the above map generator can be viewed as a logistics solution generator. Additionally, the map qualification system can be viewed as a solution qualification system. While the above discussion is specific to physical operations within a logistics facility, the concept of receiving baseline logistics information and modification parameters at a logistics solution generator can be abstracted to systems related to delivery networks, transfers between production operations, management of automated vehicle systems, and other distributed networks that have individual components that can operate independently, but are restricted by resources shared between the individual components. Similarly, the individual components can be operated independently, but are interconnected in the utilization of resources associated with the distributed network. Further, the variable space for designing systems associated with the distributed network can involve the allocation of limited network resources to individual operations that cascade to alter have other network resources can be allocated. For example, placement of a travel lane and assignment of an orientation (i.e., travel direction within the travel lane) within a warehouse modifies placement of storage locations, other travel lanes, and how the surrounding resources can be managed. The addition of further restriction of viable locations via obstacles and limitations on how resources can be allocated further magnify the impact of individual design decisions that accumulate as the design process progresses. Accordingly, the distributed networks can be simulated by the logistics qualification system to identify the candidate solutions that effectively leveraged design decisions to determine efficiency improvements that can be weighed against efficiency costs for the associated design decisions and/or algorithms.

Currently, design of large-scale logistics facilities and operations is a time consuming, labor intense, and error prone manual process. Additionally, as the volume of transactions within a logistics facility or operation increase, the errors and inefficiencies of the manually designed layout or schedule associated with the logistic facility or operation become more pronounced due to the expanded variable space that dictates how individual aspects of the facility and/or operation interact. In particular, manually designed facilities utilize floorplans or maps that inefficiently route travel lanes, include throughput limiting collections of storage locations, and generally suffer from the inability of human designers to accurately interpret and utilize the depth of information associated with the allocation of storage locations and travel lanes within a warehouse or similar facility. Further, manual optimization of maps can result in facility and operation designs that approach a local inefficiency minimum based on systematic/underlying flaws of the original design of the facility and/or operation that may not be recognized by manual review. A map generation and qualification system can design, modify, and/or redesign logistic facility layouts, schedules, maps, and other organizational products to identify performance benefits and costs associated with the parameters to facility designers. Accordingly, the described systems and methods allow for creation of candidate maps according to one or more input parameters, simulation of the candidate maps within a virtual environment, and selection of qualified maps according to performance objectives represents an improvement to the technical field of structured systems design.

FIG. 1 illustrates an example method for generating a plurality of candidate maps from a baseline map and one or more input parameters and selecting a qualified map. In particular, FIG. 1 illustrates a baseline map 102 and one or more parameters 104 that are provided to a map generator 106. Additionally, the map generator 106 can determine one or more candidate maps 108. It should be noted that, while FIG. 1 depicts candidate maps 108(A)-108(D), any number of candidate maps 108 can be generated from the baseline map 102 and the parameters 104. Further, a map qualification system 110 can receive the candidate maps 108 and determine one or more qualified maps 112. The one or more qualified maps 112 can be output by the map generator 106 and the map qualification system 110 in response to modifying the baseline map 102 in light of the one or more parameters 104, wherein the one or more parameters 104 can include variables such as offset fiducials 114, cluster width specifications 116, travel lane thresholds 118, and/or other parameters provided with the baseline map 102.

In some embodiments, the map generator 106 can be provided with a baseline map 102 that includes structural details regarding a logistics facility. In particular, the baseline map 102 can include dimensions of the facility, a floorplan that describes room dimensions and room layout, one or more indications of structural features such as support beans and load-bearing walls, and other features of the logistics facility that may not be freely modified. Additionally, the baseline map 102 can include features of the logistics facility such as emergency exits, office space, and other portions of the logistics facility that can remain static through the modification, redesign, and/or design of candidate maps 108. Further, the baseline map 102 can include modifiable features of the logistics facility such as travel lanes, robotic drives, storage locations, priority pathing, and other features that can be altered by the map generator 106. In at least one embodiment, the baseline map 102 can indicate that the logistics facility includes multiple storage regions, wherein a storage region includes a plurality of storage locations. The storage region can be a peripheral storage region that is adjacent to item routing endpoints, a deep storage region that requires extended item routing to move items from the associated storage locations to destinations, or other storage regions that are defined by a feature or organizational classification. In at least one embodiment, the baseline map 102 can be configured to only include external walls of the logistics facility and/or major structural features (i.e., support pillars, stairwells, etc.) of the logistics facility that cannot be modified (or that would require significant time, cost, and/or resources to modify). In particular, the baseline map 102 can be configured to provide only the structural features of the logistics such that the map generator 106 can place travel lanes and storage locations within the logistics facility.

In some embodiments, the one or more parameters 104 can include a selection of variables that are to be modified to produce the one or more candidate maps 108. As noted above, this can include parameters such as offset fiducials 114, cluster widths 116, and travel lane thresholds 118. In particular, offset fiducials 114 can indicate zones of the baseline map 102 that are to be preserved during creation of the one or more candidate maps 108. The offset fiducials 114 can identify one or more fiducials that are to be remain unaltered between the baseline map 102 and the one or more candidate maps 108. Additionally, the travel lanes, storage locations, and/or other features of the logistics facility that are associated with the offset fiducials 114 can be maintained between the baseline map 102 and the one or more candidate maps 108. Alternatively, the offset fiducials 114 can explicitly indicate one or more travel lanes and/or storage locations that are not included in the portion of the logistics facility to be modified and/or designed by the map generator 106.

In some additional embodiments, the offset fiducials 114 can indicate offset cells, wherein the offset cells identify one or more cells within a grid of cells that are to remain unaltered. Additionally, a fiducial can be configured as a cell within the grid that encompasses the logistics facility and can be designated as a storage location, an obstacle, a travel lane, and/or additional features within the logistics facility and/or storage region. Alternatively, a cell within the grid can include a plurality of fiducials that are individually designated to be utilized as storage locations and/or travel lanes. Further, the portions of the logistics facility that are preserved according to the offset fiducials 114 and/or the offset cells can include entire storage regions or areas extending from a boundary of the logistics facility. A series of coordinates can identify the zones, regions, and/or other features of the baseline map 102 that are to be preserved based at least on the offset fiducials 114 and/or the offset cells. In at least one embodiment, the logistics facility can include one or more storage regions that are each comprised of a plurality of storage locations. In at least one embodiment, groups of fiducials designated as storage locations can be bounded by travel lane fiducials to define fiducial clusters (i.e., storage clusters). Additionally, the cells of the grid can represent the fiducial clusters. Further, the fiducial clusters can include fiducials that have been designated as obstacles within the logistics facility.

In at least one additional embodiment, the cluster width specification 116 can define the maximum width of a cluster, wherein a cluster can indicate a group of storage zones between a first travel lane and a second travel lane. Accordingly, the cluster width can indicate the maximum number of storage locations that can be placed between the first travel lane and the second travel lane. For example, a cluster width of four indicates that at the most, a storage location can have one additional storage location between the storage location and the nearest travel lane. Similarly, a cluster width of five or six indicates that two additional storage locations can be planned between the storage location and the nearest travel lane. In at least one further embodiment, the travel lane thresholds 118 can indicate a number of travel lanes that can traverse a region of interest within the baseline map 102. The travel lane thresholds 118 can indicate a maximum number of travel lanes, a minimum number of travel lanes, a threshold associated with horizontal or vertical travel lanes within a region, and other variables that can modify how a region of interest is populated with travel lanes by the map generator 106.

In some additional embodiments, the one or more parameters 104 can include additional variables such as weighting for travel lane placement within different storage regions within the logistics facility, starting directions for vertical and horizontal travel lanes, frequency of travel lane direction change when defining travel lanes, creation of travel lane perimeters, obstruction limits for travel lanes, and other additional variables related to the layout of the logistics facility. In particular, travel lane direction variables (i.e., starting directions for travel lanes, frequency of travel lane direction changes, etc.) can be utilized to define how travel lanes can be utilized to route items from storage locations to destinations, accelerated travel lanes, and/or otherwise improve the routing of items within the logistics facilities. For example, where the region of interest being modified by the map generator 106 does not include priority travel lanes, the frequency of travel lane direction changes can modify the number of sequential travel lanes that route items in the same direction, to limit congestion caused by items from the region being directed in a single direction or to permit funneling of items along an expedited route to associated destinations.

In at least one embodiment, weighting different kinds of travel lanes can allow for the map generator 106 to prioritize routing of items from storage locations to accelerated travel lanes, high throughput travel lanes, or other travel lanes configured to efficiently extract items from the logistics facility (i.e., travel lane highways). Alternatively, travel lane weighting may allow for travel lanes within different storage regions to have priority for moving items to the travel lane highways, such as travel lanes within deep storage regions (i.e., regions having a travel distance between the associated storage locations and logistics facilities destinations equal to or greater than a distance threshold). In at least one additional embodiment, the parameters 104 can define how travel lanes placement should handle obstacles within the logistics facility. The travel lanes can optionally be placed to form a perimeter around one or more types of obstacles (i.e., large structural obstacles such as stairwells, emergency areas, etc.) and/or route the travel lane around one or more additional types of obstacles (i.e., smaller structural obstacles such as structural pillars, pipes, etc.). Similarly, placement of travel lanes can be limited based on the number of obstacles that the travel lane would have to path around. Accordingly, the one or more parameters 104 can include additional variables utilized to determine layouts and pathing within the logistics facility.

In some further embodiments, the one or more parameters 104 can indicate additional configuration information for the map generator 106 including rule sets defining travel lane placement strategies, post process editing of candidate maps 108, and other configuration information for the map generator 106. In particular, travel lane placement strategies can be provided for vertical travel lane placement, horizontal travel lane placement, or a general placement of travel lanes within the logistics facility and/or a storage region (i.e., deep storage region, peripheral storage region, etc.). The travel lane placement strategies can provide rule sets that can be utilized by the map generator 106 to determine spatial relationships between travel lanes and/or determine what travel lane placements are to be prioritized within the logistics facility and/or storage region. For example, vertical travel lanes can be determined to be primary travel lanes for moving items large distances within deep storage regions which horizontal travel lanes can be determined to be secondary travel lanes that route items from associated storage locations to the vertical travel lanes. Additionally, the one or more parameters 104 can include rule sets that modify the one or more candidate maps 108 in a post processing or verification function of the map generator 106. The rule sets can define travel lane or travel cell (i.e., a component of the travel lane, a series of interconnected travel cells can form a travel lane) placements that are to be removed or altered. For example, travel cells that are not adjacent to at least two additional travel cells can be removed by the map generator 106 prior to the transmission of the one or more candidate maps 108 to the map qualification system 110.

In some embodiments, the map generator 106 can receive the baseline map 102 and the one or more parameters 104 and initiate the candidate map generation process. In particular, the map generator 106 can determine a grid of cells to identify obstructions, structural features, storage regions, and other features of the logistics facility. It should be noted that while the cells can be organized in a grid, individual cells and/or fiducials within the cells can have varying dimensions and can include varying numbers of storage locations. Additionally, the map generator 106 can determine a zone of interest that is to be modified, designed, and/or redesigned within the logistics facility based on the offset fiducials 114 and/or the offset cells provided by the one or more parameters 104. Once the map generator 106 has determined the zone of interest to be modified and identified the cells within the region of interest, the one or more candidate maps 108 can be generated based on the one or more parameters 104. As stated above, the parameters 104 can be individual values, instructions, binary indications, value ranges, and/or other instructions for producing the one or more candidate maps 108.

In some additional embodiments, the map generator 106 can determine placement for one or more travel lanes within the zone of interest based at least in part on the one or more parameters 104. In particular, the map generator 106 can modify the storage location organization of the cells and/or within the cells, restructure travel lane flows, alter travel lane placement and direction, and otherwise restructuring item routing within the zone of interest based on the one or more parameters 104. Additionally, the map generator 106 can implement features indicated by the one or more parameters 104 such as a highway surrounding the perimeter of the zone of interest, placement and number of vertical and horizontal travel lanes within the zone of interest, and routing of travel lanes around obstacles or placing travel lanes to avoid obstacles within the zone of interest based on parameters 104 such as the travel lane thresholds 118. Further, the map generator 106 can also consider the direction of travel lanes and highways outside of the zone of interest when placing and orienting travel lanes and highways within the zone of interest.

In some further embodiments, the map generator 106 can modify the number and organization of cells or of storage locations within the cells for the zone of interest. In particular, the map generator 106 can modify the cluster width 116 associated with individual storage clusters. As noted above, cluster width 116 can indicate the number of storage locations between a first travel lane and a second travel lane. While both the first travel lane and the second travel lane are generally aligned in the same orientation (i.e., both are vertical travel lanes or horizontal travel lanes), the first travel lane and the second travel lane can travel in the same direction, opposite direction, or even be aligned perpendicularly. Additionally, cluster width 104 can indicate the maximum distance between a storage location and one or more travel lanes. For example, the cluster width 104 can indicate a maximum cluster width of four, five, or six storage locations within the region of interest. Accordingly, the cluster width 104 can set a maximum number of storage locations between a deepest storage location (i.e., one storage location for a cluster width of four and two storage locations for a cluster width of five or six) and the nearest travel lane.

In some embodiments, the candidate maps 108(A)-(D) can be produced by the map generator 106 based on the baseline map 102 and the parameters 104. In particular, the candidate maps 108 can be independently generated solutions that modify, design, and/or redesign at least part of the baseline map 102. Additionally, the candidate maps 108 can depict the structural features of a logistics facility, as provided by the baseline map 102, and a plurality of altered travel lanes, storage locations, mobile obstacles (i.e., employee workspace, charging stations for robotic drives and automated fork lifts, logistics facility equipment etc.), and other features of the logistics facility that are altered in light of the one or more parameters 104. For example, each of the candidate maps 108(A)-(D) can be generated based on a set of the one or more parameters 104, wherein the set of parameters 104 used to generate each of the candidate maps 108(A)-(D) can be independent of the other sets (i.e., a first set specifies that particle swarm optimization is to be used for candidate map 108(A), a second set specifies that cluster width modification is to be used for candidate map 108(B), a third set specifies that least visited segment optimization is to be used for candidate map 108(C), and a fourth set specifies that least visited segment optimization and cluster width modification is to be used for candidate map 108(D)) or be variations of the one or more parameters 104 (i.e., the first set specifies a first offset fiducial and a horizontal travel lane threshold for candidate map 108(A), the second set specifies the first offset fiducial and a vertical travel lane threshold for candidate map 108(B), the third set specifies a second offset fiducial and the horizontal travel lane threshold for candidate map 108(C), the fourth set specifies the second offset fiducial and the vertical lane threshold for candidate map 108(D), etc.). Further, the candidate maps 108(A)-(D) can be determined based on variations of one or more targeted objectives. For example, candidate map 108(A) can be targeted at a 4% increase in storage locations compared to the baseline map 102 with no more than a 1% increase in average operation time. Similarly, candidate map 108(B) can have a target of 3% increase in storage location with no more than a 0.75% increase in average operation time. Further iterations of the one or more targeted objectives can be implemented for candidate maps 108(C) and 108(D).

In some additional embodiments, and as noted above, the candidate maps 108 can be produced by the map generator 106 based on one or more sets of parameters 104 or based on one or more variations of parameters 104. In particular, candidate maps 108(A)-(D) can individually be associated with different parameter or different values of the same parameters. Additionally, once the map generator 106 has produced the one or more candidate maps 108, the map generator 106 can perform post processing of the candidate maps 108(A)-(D). For example, the map generator 106 can determine whether the candidate maps 108(A)-(D) include travel cells that are dead ends, are associated with less than two additional travel cells, have adjacent travel cells with conflicting orientations, and other conflicts within the candidate maps 108(A)-(D). Further, the map generator 106 can further modify the candidate maps 108(A)-(D) to correct and/or remove any conflicts detected associated with the travel lanes.

In some embodiments, a map qualification system 110 can operate to identify one or more of the candidate maps 108 that satisfy one or more objectives and determine potential operational costs associated with the candidate maps 108 compared to the baseline map 102 and other candidate maps. In particular, the map qualification system 110 receives the one or more candidate maps 108 from the map generator 106 and simulates operations associated with the logistics facility for both the baseline map 102 and the one or more candidate maps 108. Additionally, the baseline map 102 is utilized to establish a baseline performance that indicates average travel times, average travel distance, storage density, and other performance indicators. Accordingly, the performance of the candidate maps 108 can be analyzed to determine performance indicators where the candidate maps 108 out-perform the baseline map 102 and additional performance indicators where the candidate maps 108 under-perform the baseline map 102. From the performance indicators and the additional performance indicators, the map qualification system 110 can determine which candidate maps satisfy one or more objectives and report one or more qualified maps 112, wherein the one or more qualified maps 112 are selected from the one or more candidate maps 108 based at least on a determination of the one or more candidate maps 108 that satisfy the one or more objectives based on the performance indicators and the additional performance indicators.

In some additional embodiments, the one or more qualified maps 112 can be selected from the one or more candidate maps 108 based on one or more performance indicators, for each of the one or more candidate maps 108, that are compared to one or more performance objectives. In particular, the one or more performance objectives can specify improvements compared to the performance indicators associated with the baseline map 102. For example, the one or more performance objectives can include improvement thresholds related to logistics facility operations, such as an increase in storage density, a decrease in average operation time, a decrease is average travel distance for items, a decrease in active robotic drives, a decrease in travel lanes, a decrease in robot drive turns, a decrease in dig operations, and other operational indicators associated with storage regions and/or the logistics facility. Additionally, the one or more performance objectives can include limit thresholds for performance costs associated with the one or more candidate maps 108. For example, the one or more performance objectives can include limit thresholds associated with a limit for a decrease in storage density, an increase in overage operation time, an increase in average travel distance for items, etc. Accordingly, the map qualification system 110 can simulate each of the one or more candidate maps 108 to determine the performance indicators and the additional performance indicators. Additionally, the performance indicators and the additional performance indicators can be compared against the one or more performance goals to identify and select the one or more qualified maps 112. Further, the one or more qualified maps 112 can include the one or more candidate maps 108 that are associated with the performance indicators that meet or exceed the improvement threshold(s) and the additional performance indicators that are less than or equal to the limit threshold(s) provided by the one or more parameters 104.

In some embodiments, the baseline map 102 can be provided to the map generator 106 in combination with the one or more parameters 104. In particular, the baseline map 102 can depict a material handling facility having a storage density and an average operation time. The material handling facility can be a storage warehouse, a delivery warehouse, a transportation facility, a shipping depot, or other facility where large volumes of transactions require the movement of goods and/or vehicles from one or more first locations, through the logistics facility or to the logistics facility, and delivery of the goods or movement of the vehicles to one or more second locations. In general, the material handling facility can be configured to move, store, sort, and otherwise complete operations related to item handling, item distribution, and other logistic operations. Additionally, the one or more parameters 104 can specify that a 4-wide storage location design associated with the material handling facility and represented by the baseline map 102 is to be modified to a 5-wide storage location design. The 4-wide design specifies that the storage clusters of the baseline map 102 are comprised of storage locations that have, at most, one storage location between individual storage locations and a nearest travel lane. The 5-wide design specifies that the storage clusters of the candidate maps 108 are comprised of storage locations that have, at most, two storage locations between individual storage locations and two, parallel travel lanes. A 6-wide design would specify that the storage clusters of the candidate maps 108 would be comprised of storage locations that have, at most, two storage locations between individual storage locations and a nearest travel lane. Accordingly, storage clusters in the baseline map 102 are 4 storage locations wide and storage clusters in the candidate maps 108 can be 5 storage locations wide.

Additionally, the map generator 106 can determine, based at least on the one or more parameters 104, additional variables for determining the candidate maps 108 such as one or more offset cells that identify storage regions that are to be modified between the baseline map 102 and the candidate maps 108. In at least one embodiment, the offset cells can identify a central storage region, a perimeter storage region, or multiple storage regions to be converted from 4-wide design to 5-wide design. In at least one additional embodiment, additional variables, as identified by the above discussion of the parameters 104, can be utilized to determine the candidate maps 108. Accordingly, the map generator 106 can identify structural features and obstacles within the storage region(s) to be modified according to the one or more parameters 104, determine a grid based on the baseline map 102, and place a plurality of travel lanes and a plurality of storage locations for each of the candidate maps 108. Further, each of the candidate maps 108 can have different travel lane and storage location placement based on differences in where the map generator 106 begins within the storage region(s) being modified, differences in parameter values utilized for each candidate map, and other variations utilized by the map generator 106.

Further, the map generator 106 can transmit the candidate maps 108 to the map qualification system 110. In particular, the map qualification system 110 can receive the baseline map 102 and the candidate maps 108 and produce a virtual environment that simulates the structural features of the logistics facility, one or more obstacles, travel lanes, and storage locations for the baseline map 102 and the candidate maps 108. Additionally, the map qualification system 110 can populate the virtual environments with robotic drives, item sources, item destinations, and other operational resources. Further, the map qualification system 110 can simulate operations within the virtual environments such as distribution of items from item sources to storage locations, retrieval of items from storage locations to item destinations, dig operations that move external storage locations of storage clusters so that internal storage locations can be accessed, and other logistics facility operations associated with item distribution (i.e., downtime for robotic drives, travel time of robot drives, load and unload times of robotic drives, etc.). Accordingly, the map qualification system 110 can simulate operations within virtual environments produced from the baseline map 102 and the candidate maps 108.

Accordingly, the map qualification system 110 can identify qualified maps 112 from the candidate maps 108 and output the qualified maps 112. In particular, the simulation of the virtual environments enables the map qualification system 110 to identify performance indicators associated with each of the candidate maps 108 and baseline performance indicators associated with the baseline map 102. The performance indicators and the baseline performance indicators can relate to storage density, average operation time, average travel distance, average travel time, and other operational indicators discussed above. Additionally, the map qualification system 110 can identify one or more performance objectives from the parameters 104 related to improvements relative to the baseline map 102 (i.e., 2% increase in storage density, 2 second reduction in average operation time, 5% reduction in average travel distance, etc.)

and maximum performance costs associated with the performance objectives (i.e., 4% increase in storage density with no more than a 1% increase in average operation time). Accordingly, the map qualification system 110 can identify qualified maps 112 from the candidate maps 108 based on the performance indicators of the candidate maps 108 meeting the performance objectives without exceeding the performance cost limits, provided by the parameters 104, relative to the baseline performance indicators of the baseline map 102. Further, the candidate maps 108 that do not satisfy the performance objective and/or exceed the performance cost limits can be optionally report or utilized as feedback for the map generator system (i.e., particle swarm optimization strategies, machine learning based map generator strategies, etc.).

It should be noted that the qualified maps 112 can be output to a user device to be implemented for the logistics facility. Alternatively, the map qualification system 110 can iteratively increase the performance objectives and reduce the performance cost limits to continually reduce the number of qualified maps 112 until a qualified map remains to be implemented at the logistics facility. In at least one embodiment, the performance objectives/limits can be increase/reduced at fixed ratios until the qualified map remains. In at least one additional embodiment, the performance objectives/limits can be ranked in priority, where higher priority performance objectives/limits are increased/reduced to identify the qualified map to be implemented by the logistics facility.

Figure 2:
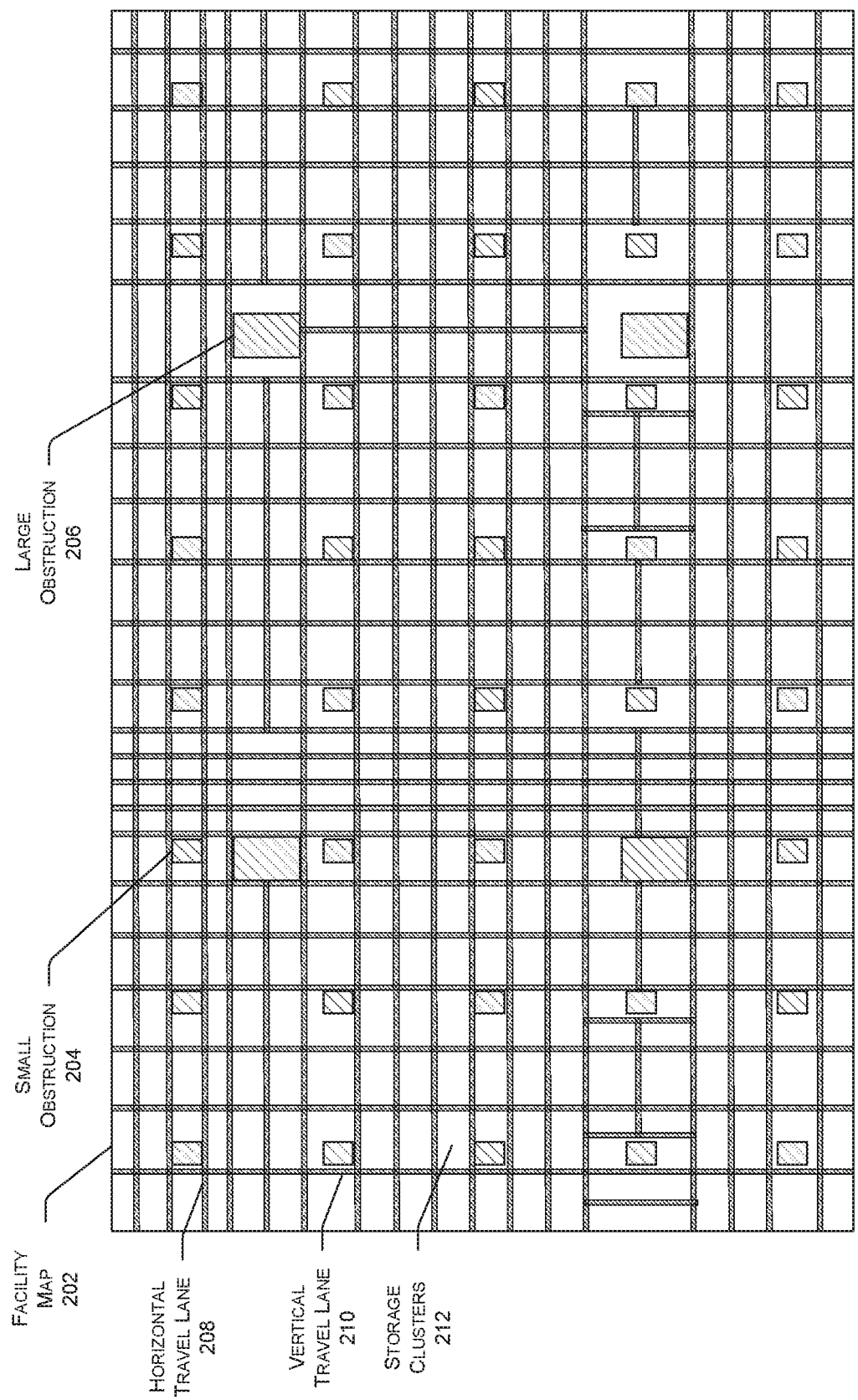
FIG. 2 illustrates an example baseline map of a storage facility floorplan that includes storage locations, travel lanes, and obstacles that can be modified or adapted during production of candidate maps by the map generator.

FIG. 2 illustrates an example baseline map of a storage facility floorplan that includes storage locations, travel lanes, and obstacles that can be modified or adapted during production of candidate maps by the map generator. The baseline map can be a facility map 202 that includes small obstructions 204 (i.e., structural supports, wiring conduits, pipelines, etc.) and large obstructions 206 (i.e., stairwells, emergency exits, office space, etc.). Additionally, the facility map 202 can display locations of horizontal travel lanes 208 (i.e., travel lanes aligned along an east-west axis, travel lanes placed substantially parallel to a top side and a bottom side of the facility map 202, travel lanes placed substantially perpendicular to vertical travel lanes 210, etc.), vertical travel lanes 210 (i.e., travel lanes aligned along a north-south axis, travel lanes placed substantially perpendicular to a top side and a bottom side of the facility map 202, travel lanes placed substantially perpendicular to horizontal travel lanes 208, etc.), and storage clusters 212. It should be noted that additional travel lanes can be placed that intersect the horizontal travel lanes 208 and the vertical travel lanes 210 at any angle. While the horizontal travel lanes 208 and the vertical travel lanes 210 can be substantially perpendicular to each other, additional travel lanes can be placed diagonally within the facility map 202 to intersect with the horizontal travel lanes 208 and the vertical travel lanes 210 at any angle. Further, additional features can be displayed within the facility map 202 that are not indicated in FIG. 2 such as travel lane highways, loading/unloading bays for shipping, item inputs and outputs, and other features relevant to the operations associated with the logistics facility. Accordingly, the facility map 202 can provide an overview and/or summary of how items can be routed throughout the facility. In at least one embodiment the horizontal travel lanes 208 can be placed with travel directions progressing from east to west and west to east. In at least one additional embodiment, the vertical travel lanes 210 can be placed with travel directions progressing from north to south and south to north.

In some embodiments, the small obstructions 204 and the large obstructions 206 can be differentiated by the map to provide a map generator additional information to determine how travel lanes should be routed around individual obstacles. In particular, one or more parameters provided to the map generator can include different rules for different classes of obstacles when placing travel lanes for the candidate maps. Alternatively, the map generator can determine different solutions for routing travel lanes based on the presence of small obstacles 204 and large obstacles 206 based on performance costs associated with different solutions. For example, a large obstacle 206 can cause the map generator to place travel lanes such that the travel lanes do not need to be routed around the large obstacle 206. Additionally, the map generator can determine that a perimeter of travel lanes is to be placed around the large obstacle 206 to collect and redirect items from storage clusters 212 around the large obstacle 206. For small obstacles 204, the map generator can cause a travel lane to route items around the small obstacle 204 up to a limit of small obstacles 204 in the path of the travel lane. Accordingly, the size, type, and solutions available for individual obstacles can be supplied by the facility map 202 to enable the map generator to utilize appropriate solutions for individual obstacles.

In some embodiments, the horizontal travel lanes 208 and the vertical travel lanes 210 provide indications of how items are routed throughout a logistics facility and can also indicate key areas of the logistics facility such as item destinations, item sources, high traffic and low traffic storage clusters 212, and other information regarding the logistics facility. In particular, the map generator can be configured to identify deep storage regions (i.e., collections of storage clusters 212 that are distant from item destinations, not directly associated with a travel lane highway, and/or include items that undergo less turnover than items in prioritized storage areas). Similarly, the map generator can be configured to identify prioritized storage regions that are located to expedite distribution and retrieval of high demand items. Accordingly, the existing layout provided by the facility map 202 can enable the map generator to identify objections of interest, organizational structures, and other associations based on an existing layout of the horizontal travel lanes 208 and the vertical travel lanes 210.

In some embodiment, storage clusters 212 can be cells within a grid that encompasses the logistics facility that have been associated with a plurality of storage locations. The grid can be a coordinate system by which items, storage locations, robotic drives, and other features of the logistics facility are aligned such that they can be tracked, directed, and/or positioned within the physical environment of the logistics facility. Further, the grid can permit references within a virtual environment associated with the logistics facility to be coordinated and related with references within the physical environment. The cells within the grid can represent individual storage clusters 212, individual storage locations, and/or travel lanes associated with the storage clusters 212. In particular, the storage clusters 212 can be determined based on the horizontal travel lanes 208 and the vertical travel lanes 210 that form perimeters for the storage clusters 212. Additionally, the storage clusters 212 can comprise one or more storage locations. The storage locations can be organized within the storage cluster 212 to be accessed via the travel lanes. Further, one or more positions within the storage clusters 212 can be occupied by small obstructions 204 and/or large obstructions 206. The number of storage locations within individual storage clusters 212 can be determined based on a cluster width that defines a maximum number of storage locations between a buried storage location (i.e., a storage location that is not immediately adjacent to a travel lane) and the closest travel lane. While the cluster width can define a limit to the number of storage locations that form one dimension of the storage clusters 212, a perpendicular dimension can be determined to exceed the cluster width.

Figure 3:
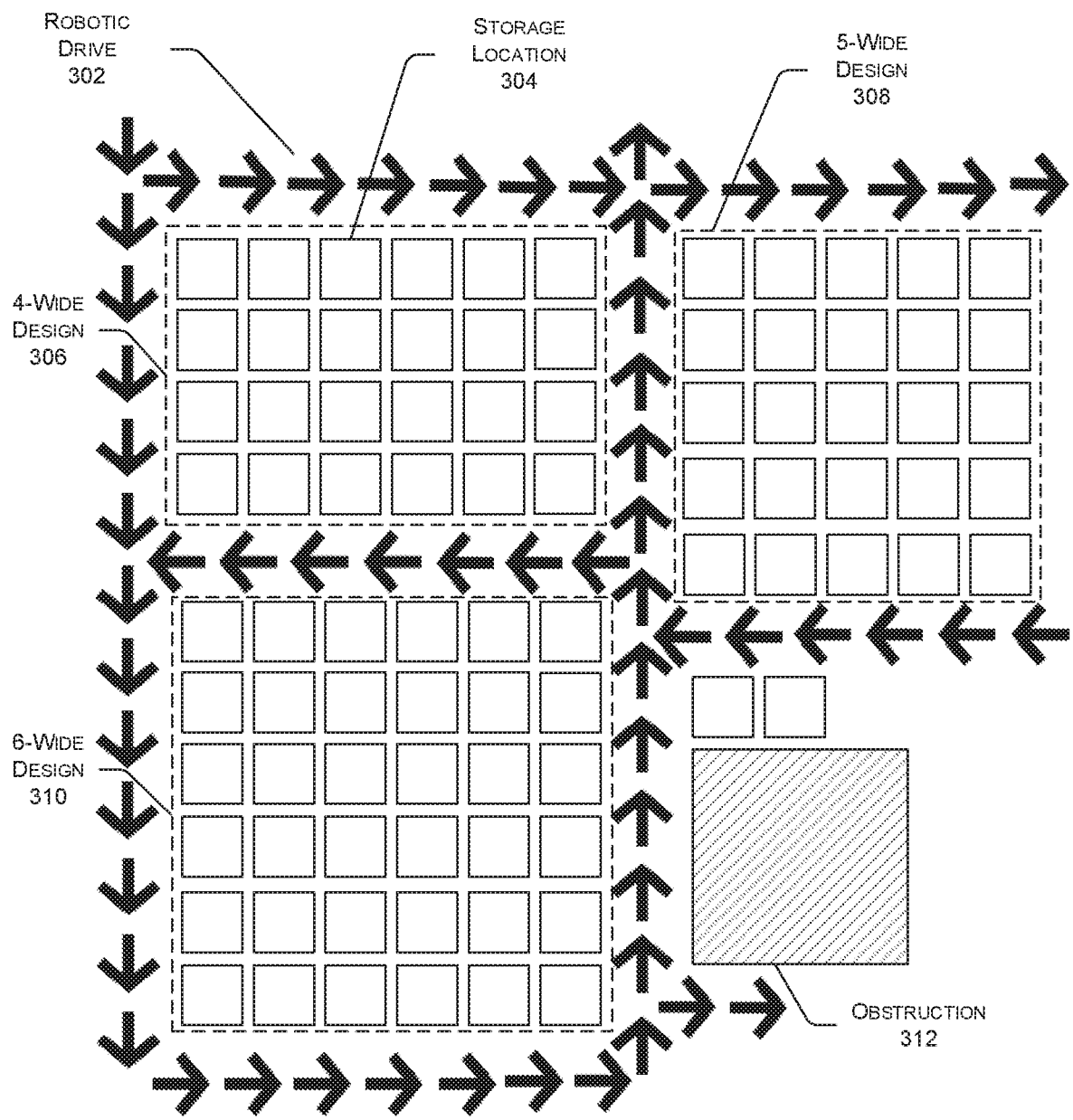
FIG. 3 illustrates a collection of robotic drives configured to route items from storage locations and around obstacles for a plurality of storage locations arranged in three storage clusters that utilize 4-wide, 5-wide, or 6-wide designs.

FIG. 3 a collection of robotic drives configured to route items from storage cells and around obstacles for a plurality of storage locations arranged in three storage clusters that utilize 4-wide, 5-wide, or 6-wide designs. In particular, a plurality of robotic drives 302 (also referred to herein as "drive units") can be configured to distribute items to and extract items from a plurality of storage locations 304. Additionally, the storage locations 304 can be arranged in a 4-wide 306, 5-wide 308, and/or 6-wide 310 cluster width. Further, the robotic drives 302 can be configured as linear paths of to form travel lanes or non-linear paths that conform to the cluster width of associated storage clusters and avoid obstructions 312.

In some embodiments, the robotic drives 302 can operate to perform a variety of tasks involved in the distribution and extraction of items within the logistics facility. In particular, the robotic drives 302 can perform at least place, extract, and dig operations at storage locations 304. Place operations comprise the operation of a robotic drive 302 receiving an item that is assigned to be delivered to a storage location 304 via the robotic drive 302. The robotic drive 302 can be associated with the storage location 304 or can be one of a plurality of robotic drives 302 configured to deliver items to the storage location 304. Similarly, extract operations comprise the operation of the robotic drive 302 retrieving an item from a storage location 304. Dig operations comprise the operation of the robotic drive 302 moving objects at a first storage location so that a second storage location, blocked by the first storage location, can be accessed for a place or extract operation. Additionally, dig operations can be repeated to remove objects from the second storage location to access a third storage location blocked by the first storage location and the second storage location. Accordingly, the robotic drives 302 within the logistics facility can operate to manipulate items and storage locations 304.

In some additional embodiments, the robotic drives 302 can be organized into, be associated with, and/or travel via travel lanes within the logistics facility. In particular, the robotic drives 302 can be robotic systems that interact with the storage locations 304 to perform the place, extract, and dig operations, such as robot arms, components of a transportation system, autonomous vehicles travelling within the travel lanes, and other systems capable of manipulating storage locations 304 and/or items placed within the storage locations 304. Additionally, the robotic drives 302 can be configured to navigate the logistics facility based at least in part on a plurality of fiducials, associated with the grid of cells, that identify travel lanes and enable the robotic drives 302 to navigate between a storage location 304 and an item source/destination.

In some embodiments, a cluster width for a storage cluster can utilize a 4-wide design 306 to organize storage locations 304 within storage clusters. In particular, the 4-wide design 306 can cause storage locations 304 within a storage cluster to be organized in sets of four storage locations 304 between two travel lanes. When the storage cluster utilizes the 4-wide design 306, the maximum number of dig operations to retrieve the item is a single dig operation. While some storage locations 304 can be closer to the travel lanes and not require a dig operation, the specification that a 4-wide design 306 is to be used causes storage location organization to place the storage locations 304 within a single dig operation from travel lane access.

In some additional embodiments, a cluster width for a storage cluster can utilize a 5-wide design 308 and/or a 6-wide design 310 to organize storage locations 304 within storage clusters. In particular, 5-wide design 308 can cause storage locations 304 within a storage cluster to be organized in sets of five storage locations 304 between two travel lanes and 6-wide design 310 can cause the storage locations 304 with the storage cluster to be organized in sets of six storage locations 304 between two travel lanes. The 5-wide design 308 can cause the storage cluster to include storage locations 304 that are two dig operations from one of two travel lanes. Additionally, the 5-wide design 308 can determine that the storage cluster includes storage locations 304 that are at least one of adjacent to one of the two travel lanes, utilize one dig operation to be accessed from one of the two travel lanes, or utilize two dig operations to be accessed from either of the two travel lanes. Similarly, the 6-wide design 310 can cause the storage cluster to include storage locations 304 that are two dig operations from a travel lane. Further, the 6-wide design 310 can determine that the storage cluster includes storage locations 304 that are at least one of adjacent to one of two travel lanes, utilize one dig operation to be accessed from one of the two travel lanes, or utilize two dig operations to be accessed from one of the two travel lanes. Accordingly, storage locations 304 within storage clusters utilizing 5-wide designs 308 and 6-wide designs 310 can utilize fewer than two dig operations, but places no more than two storage locations 304 between individual storage locations 304 and a closest travel lane. While organization of storage clusters utilizing 5-wide and 6-wide designs places storage locations 304 within two dig operations of at least one travel lane, wider designs (i.e., 7-wide, 8-wide, etc.) can utilize more dig operations while narrower designs (i.e., 3-wide, 4-wide, etc.) can utilize fewer dig operations.

In some further embodiments, storage clusters can use different cluster widths for different orientations. For example, a first storage cluster, depicted in FIG. 3 as the collection of storage locations 304 associated with 4-wide design 306, can have a first dimension (i.e., the vertical dimension in FIG. 3 that runs from north to south) that is four storage locations 304 wide. However, as the 4-wide design 306 determines that the storage locations 304 of the storage cluster can be accessed via a single dig operation, a second dimension (i.e., the horizontal dimension in FIG. 3 that runs from east to west) can include one or more storage locations 304, and potentially exceed four storage locations 304, in the horizontal direction. Due to the first dimension utilizing the 4-wide design 306, the second dimension can extend beyond four storage locations 304 and remain a 4-wide design 306. Alternatively, a second storage cluster, depicted in FIG. 3 as the collection of storage locations 304 associated with 5-wide design 308 or 6-wide design 310, can utilize the cluster width (i.e., 4-wide design, 5-wide design, 6-wide design, etc.) for the first dimension and the second dimension. For example, the first dimension can be a horizontal dimension associated with a cluster width of five storage locations 304, as depicted by the 5-wide design 308. Additionally, the second dimension can be a vertical dimension associated with a cluster width of five storage locations 304, as depicted by the 5-wide design 308. Independent of how the storage clusters are configured, the robotic drives 302 can be utilized to place, extract, or dig from the shortest distance between the travel lane and the storage location, scenarios may develop where a longer path to access the storage location is utilized if available. Accordingly, where a dimension exceeds the cluster width specified by the design (i.e., the storage cluster associated with the 4-wide design), a scenario can occur where a storage location is accessed from a travel lane that is further than the distance specified by the cluster width (i.e., accessing a storage location within the 4-wide design from the east or west travel lane that requires two dig operations).

Figure 4:
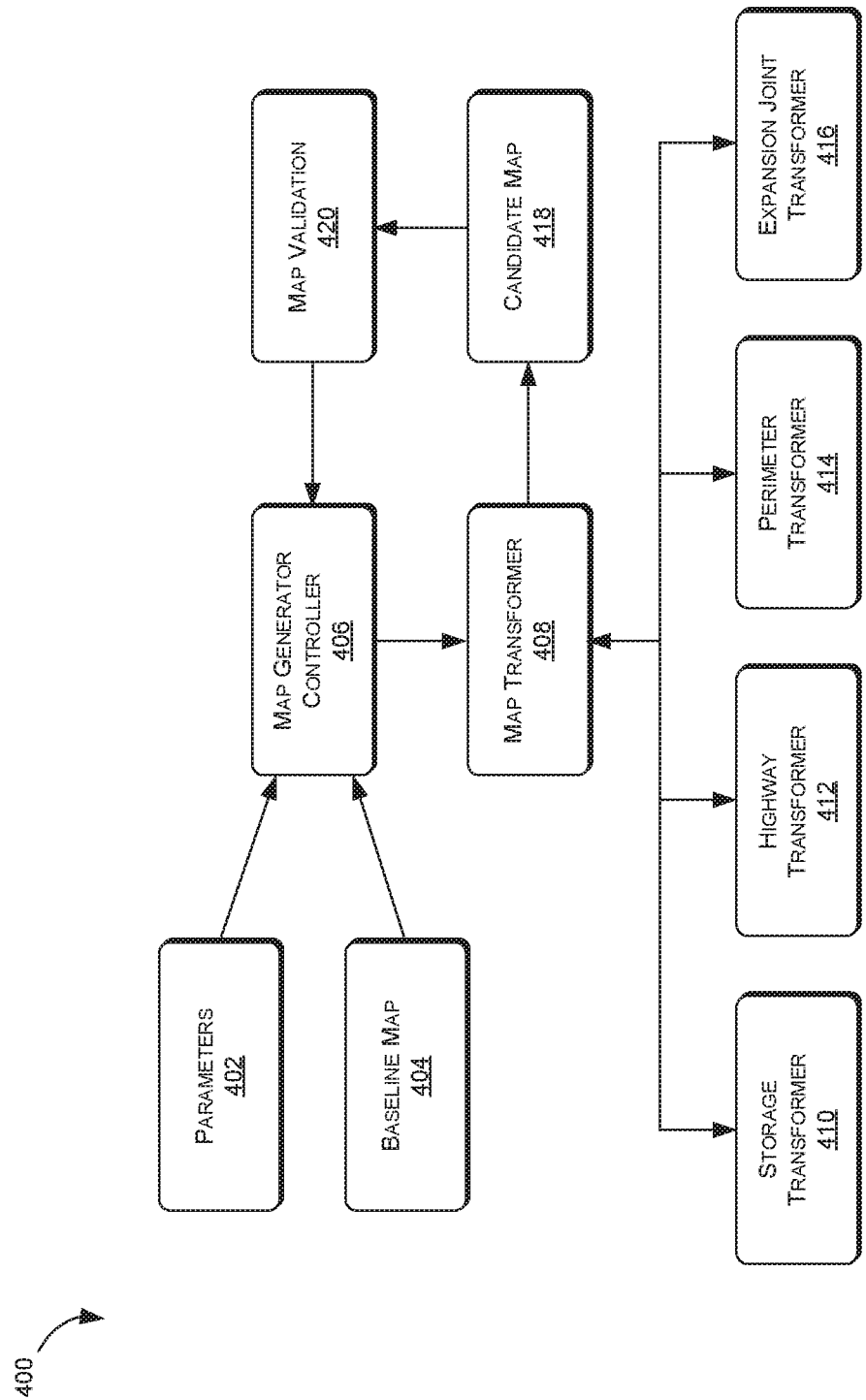
FIG. 4 illustrates an example computing environment representing a map generator that receives input parameters and a baseline map at a computing environment controller and that performs one or more transformation operations for the baseline map based on the input parameters.

FIG. 4 illustrates an example computing environment representing a map generator 400 that receives input parameters and a baseline map at a computing environment controller and performing one or more transformation operations for the baseline map based on the input parameters. In particular, input parameters 402 and baseline map 404 can be received by a map generator controller 406. Additionally, the map generator controller 406 can analyze the input parameters 402 and the baseline map 404 to determine one or more transformations to be applied to the baseline map 404. Further, the map generator controller 406 can cause a map transformer 408 to activate one or more of a storage transformer 410, a highway transformer 412, a perimeter transformer 414, and an expansion joint transformer 416 to produce candidate map 418. The candidate map 418 can be transferred to map validation 420 for post processing before being returned to the map generator controller 406 for output to a map qualification system.

In some embodiments, the parameters 402 and the baseline map 404 can be similar to those described above with respect to FIGS. 1-3. In addition to the discussion from FIGS. 1-3, the parameters 402 and the baseline map 404 can relate to additional processes such as scheduling incoming and outgoing shipments associated with a logistics facility, managing automated vehicles transporting items via mapped pathways, robotic systems within logistics networks, and other operations utilizing signals and data to generate strategies for managing complex systems that rely on a plurality of variables to operate. In general, the described system is capable of receiving an outline of existing networks, procedures, and systems in combination with modifiable parameters 402 and outputting candidate solutions that modify and/or redesign existing systems to increase resource density and/or throughput.

In some embodiments, a map generator controller 406 can receive the input parameters 402 and the baseline map 404 and determine that one or more transformations are to be applied to the baseline map 404. In particular, the map generator controller 406 can receive the input parameters 402 and identify one or more sets of variable values, variable ranges, and modification strategies for applying transformations to the baseline map 404 to generate candidate maps 418. Additionally, the map generator can utilize one or more approaches for determining how storage locations, travel lanes, and other features of the candidate maps 418. For example, the map generator can utilize approaches such as particle swarm optimization, cluster expansion, and least visited segment optimization.

In at least one embodiment, the map generator controller 406 can utilize the particle swarm optimization approach when determining transformations to be applied to the baseline map 404 based on the input parameters 402. In particular, the particle swarm optimization approach is an iterative approach that utilizes feedback from map qualification to repeatedly generate and refine the input parameters 402 based on how the candidate map 418 performs during map qualification. While the input parameters 402 can be initially determined by a user associated with the map generator controller 406 and map qualification system, the performance of each generation of candidate maps 418 can be utilized to refine the input parameters 402 provided to the map transformer 408 by the map generator controller 406 based on improvements to performance indicators determined by the map qualification system. Accordingly, the map generator controller 406 can be provided with a goal, such as generate candidate maps 418 that improve storage density within a logistics facility, generate a plurality of candidate maps 418 based on the input parameters 402 and the baseline map 404, receive feedback on the performance of the candidate maps 418 from a map qualification system regarding storage density associated with the candidate maps 418, and identify parameters that resulted in improved storage density to utilize as input parameters 402 for the next generation of candidate maps 418.

In at least one additional embodiment, the map generator controller 406 can utilize the least visited segment approach when determining transformations to be applied to the baseline map 404 based on the input parameters 402. In particular, the least visited segment approach can include providing the map generator controller 406, as a part of the input parameters 402, data representing the frequency that storage locations and/or cells within a logistics facility are visited (i.e., how often items are placed or extracted rom each storage location) by drives (and/or individuals) over a period of time or during a simulation. The map generator controller 406 can identify segments (i.e., groups of storage locations, fiducials, cells, storage clusters, travel lanes, and other areas within the logistics facility) that are less frequently visited or more frequently visited and determine placement for the segments based at least in part on how often the segments are utilized during operation. Accordingly, frequently visited and infrequently visit segments can be distributed by the map generator controller 406 to improve item throughput efficiency by distributing high-activity and low-activity segments, increase storage density by converting low-activity segments from travel lanes to storage locations, improve operations by increasing travel lane density where congestion occurs, and other determinations that modify the baseline map 404 based on the input parameters 402 and the frequency that segments are utilized.

In at least one further embodiment, the map generator controller 406 can utilize the cluster expansion approach when determining transformations to be applied to the baseline map 404 based on the input parameters 402. In particular, the cluster expansion approach includes the conversion of smaller cluster width (i.e., two, three, and/or four storage location wide clusters) storage clusters to larger cluster width (i.e., five and/or six storage location wide clusters) storage clusters. Alternatively, where the map controller 406 determines cluster compression is necessary, the map transformer 408 can be instructed to convert larger cluster width storage clusters to smaller cluster width storage clusters. Additionally, the cluster expansion approach can determine travel lanes that are to be maintained from the baseline map 404, can determine travel lane placement for candidate map 418, and a zone/area within the baseline map 404 to be modified and/or designed based at least on the input parameters 402. It should be noted that the individual approaches of particle swarm optimization, least visit segment, and cluster expansion can be utilized in combination to more effective design and/or modify the baseline map 404 to produce the candidate maps 418. For example, feedback obtained from the particle swarm optimization approach can be utilized to identify cells within the baseline map 404 that benefit from organization according to the frequency that the storage locations associated with the cells are accessed and/or benefit from undergoing cluster expansion. Additionally, the feedback can refine the input parameters 402 utilized in determining cluster expansion and organization of cells, storage clusters, and/or travel lanes based on the frequency of use.

In some additional embodiments, the map generator controller 406 can analyze the input parameters 402 and the baseline map 404 to determine a region of interest that can be designed, modified, and/or redesigned by the map generator 400. Additionally, the map generator controller 406 can determine and index the position and orientation of horizontal travel lanes, vertical travel lanes, and/or cells (i.e., storage fiducials that describe storage locations, travel lane fiducials that describe the travel lanes, or structure fiducials that describe structural features of the logistics facilities that travel lanes cannot be routed through) within the region of interest. Further, the map generator controller 406 can determine one or more modification strategies to be utilized by the map transformer 408. For example, the map generator controller 406 can determine that the map transformer 408 is to apply modifications to the baseline map 404 based on at least one of particle swarm optimization, cluster width modification, least visited segment organization, and/or other travel lane and cell modification strategies. Where feedback from a map qualification tool is received by the map generator controller 406, the map generator controller 406 can be configured to determine, from the received feedback, one or more altered input parameters based on the one or more input parameters 402 that produced a candidate map 418 associated with the received feedback.

In some further embodiments, the map generator controller 406 can be configured to determine a plurality of candidate maps 418 that are to be produced by the map transformer 408 based on the one or more input parameters 402. In particular, the map generator controller 406 can analyze the one or more input parameters 402 to identify one or more sets of input parameters 402, wherein each set of parameters can cause the map transformer 408 to produce one or more candidate maps 418. For example, a parameter set comprising defined-value variables can cause a single candidate map 418 to be produced while a parameter set comprising additional variables defined as a range of values that cause a plurality of candidate maps 418 to be produced as the map transformer 408 produces candidate maps 418 based on variations of the additional variables. Additionally, the map generator controller 406 can determine modification strategies for the map transformer 408 to utilize when producing the one or more candidate maps 418 for a set of input parameters 402. Accordingly, the map generator controller 406 can cause the map transformer 408 to utilize the same set of input variables multiple times by changing the modification strategy sent to the map transformer 408. Further, as the map generator controller 406 receives feedback from the map qualification system, the map generator controller 406 can generate additional sets of input variables that are added to the queue of input variable sets to be provided to the map transformer 408. Accordingly, the map generator controller 406 can cause one or more candidate maps 418 to be produced, transmitted to the map qualification system, and introduce refined sets of input variables for the map transformer 408 where feedback is received from the map qualification system.

In some embodiments, a map transformer 408 can operate to determine placement of storage locations, placement of travel lanes, determination of storage regions, and other design determinations related to the baseline map 404 and the grid of cells. In particular, the map transformer 408 can utilize the variables provided by the map controller to implement modification of the baseline map 404 to produce the candidate map 418. The map transformer 408 can include a storage transformer 410 configured to determine different storage regions, a highway transformer 412 configured to determine high volume and/or high throughput travel lanes, a perimeter transformer 414 configured to determine perimeter travel lanes for the different storage regions, and/or an expansion joint transformer 416 configured to determine connections between the baseline map 404 and other operational areas of the logistics facility. As discussed above with respect to FIG. 1, the variables can determine the number of travel lanes that can be defined for the baseline map 404, offset cells that define a zone and/or region of interest that is to be modified and/or designed by the map generator 400, placement strategies for storage locations and travel lanes, and other variables provided by the input parameters 402.

In some additional embodiments, the map transformer 408 can be caused, by the map generator controller 406, to construct the candidate map 418 from the provided variables and the baseline map 404. In at least one embodiment, the map transformer 408 can modify the baseline map 404 directly, altering the travel lanes, storage locations, and other alterable features described by the baseline map 404. In at least one additional embodiment, the map transformer 408 can extract the unalterable features of the baseline map 404, such as support structures, exits, shipping depots, item destinations, item sources, walls, and/or stairwells. However, in general, the map transformer 408 can be configured to sweep from one boundary of the region of interest, selected according to the baseline map 404 and any offsets describe by the input parameters 402, to an opposite boundary of the region of interest. Alternatively, the map transformer 408 can be configured to initiate the transformation of the baseline map 404 at the boundaries of the region of interest and sweep from the outer portions of the region of interest to the center of the region of interest. While the region of interests can be rectangular, as shown by FIGS. 1 and 2, the region can be of any shape that encompasses an area that includes travel lanes and storage locations.

In some further embodiments, the map transformer 408 can be configured to determine placement of travel lanes and storage locations within the region of interest identified by the offset cells and/or the baseline map 404.

In some embodiments, a storage transformer 410 can operate to modify storage locations within the baseline map 404. In particular, the storage transformer 410 can modify the cluster width of storage locations within the baseline map 404 and covert between storage locations and travel lanes to reorganize the baseline map 404. Additionally, the storage transformer 410 can utilize least visit segment analysis to determine storage locations that are high priority and low priority and reorganize individual storage locations for classes of items to be closer to or further from item sources and item destinations.

In some embodiments, a highway transformer 412 can operate to place travel lane highways within the region of interest. In particular, the highway transformer 412 can determine travel lanes that are high priority avenues for the distribution of items within the logistics facility (i.e., travel lane highways). Accordingly, the highway transformer 412 can cause travel lanes within the baseline map 404 to be widened, straightened, or otherwise cleared to enable rapid traversal of the logistics facility. Additionally, in at least one embodiment, the travel lane highways implemented by the highway transformer 412 can include restrictions on dig operations within the travel lane highways.

In some embodiments, the storage transformer 410 and the highway transformer 412 can operate to place storage locations, travel lanes, and travel lane highways within the region of interest. In particular, the storage transformer 410 and/or the highway transformer 412 can operate to place travel lanes and travel lane highways based at least in part on wireless access point positions throughout the logistics facility. Reliable wireless connections can enable optimal operation of robotic drives when completing place, extract, and dig operations within the logistics facilities. When robotic drives lose wireless connections, they can stop, cause traffic congestions, deviate from an intended route, potentially collide with other robotic drives, and/or potentially collide with other objects/structures within the logistics facility. Accordingly, positions for one or more wireless access points can be determined based on the one or more parameters 402 and/or the baseline map 404. Alternatively, the map transformer 408 can operate to place wireless access point positions within the candidate maps 418. In at least one embodiment, the one or more wireless access points can be positioned to maintain a wireless signal coverage within the logistics facility such that each cell in the grid receives wireless signals, with signal strengths exceeding a signal strength threshold, from one or more wireless access points. In at least one additional embodiment, the one or more wireless access points can be positioned to maintain the wireless signal coverage within the logistics facility such that each cell in the grid receives a primary wireless signal, with a signal strength exceeding the signal strength threshold, and a backup wireless signal that is utilized if the primary wireless signal strength does not exceed the signal strength threshold. It should be noted, that a wireless signal attenuates much faster when it passes through solid barriers (i.e., walls and filled storage locations). Accordingly, the map transformer 408, the storage location transformer 410, and/or the highway transformer 412 can align travel lanes with the one or more wireless access points to minimize attenuation of the wireless signals and maximize the area covered by each wireless access point within the logistics facility.

In some additional embodiments, the map transformer 408, the storage location transformer 410, and/or the highway transformer 412 can utilize a cost function for storage location and travel lane placement that assigns weights to multiple objectives including wireless access point alignment, storage density, obstruction avoidance, and other objectives that impact placement of storage locations and travel lanes. In particular, the weights can be utilized to associate a cost with each travel lane to be placed for the candidate map 418. In at least one embodiment, a base cost for a travel lane can be determined based on a number of cells assigned to the travel lane and the reduction in storage density caused by the travel lane. Additionally, the cost function can include a penalty for each obstruction on the travel lane. Each obstruction can cause additional travel distance to be added to otherwise straight travel lanes such that the travel lane avoids the obstacle. In at least one additional embodiment, the cost function can be configured to reduce the travel lane cost for each aligned wireless access point such that travel lanes associated with multiple backup wireless access points are determined to have a lower cost. For example, the map transformer 408, the storage location transformer 410, and/or the highway transformer 412 can be configured to alternate placement of horizontal travel lanes and the vertical travel lanes that are aligned with at least one wireless access point. Alternatively, the map transformer 408, the storage location transformer 410, and/or the highway transformer 412 can be configured to select a most optimal alignment for a new travel lane, wherein the most optimal alignment is determined based at least on the wireless access point associated with a minimum placement cost and/or a placement cost that is below a cost threshold. Accordingly, the placement of the travel lanes can be configured to align the travel lanes with one or more wireless access point alignment such that a majority or all wireless access points have aligned travel lanes while minimizing impact on storage density and floor traffic. It should be noted that the cost function can be configured to associate individual parameters of the one or more parameters 402 with increased or decreased costs when determining a cost associated with the placement of the travel lanes.

In some further embodiments, the map transformer 408, the storage location transformer 410, and/or the highway transformer 412 can be configured to place one or more wireless access points within the one or more candidate maps 418. In particular, the wireless access points can be placed such that the logistics facility has complete wireless access point coverage to maintain connections with the robotic drives. For example, a similar cost function can be utilized that increases placement costs of wireless access points where a plurality of wireless access points are configured to provide connections to a single location (i.e., a cell, a fiducial, a travel lane, etc.) and reduce costs where a wireless access points provides connections to otherwise connectionless locations. Accordingly, the map transformer 408 and the associated modules can be configured to independently place travel lanes and wireless access points, place travel lanes based on wireless access points, and/or place wireless access points based on travel lanes.

In some embodiments, a perimeter transformer 414 can operate to place a travel lane perimeter around the region of interest. In particular, the perimeter transformer 414 can determine, based on one or more input parameters 402, that a perimeter travel lane is to be implemented for candidate maps 418. Additionally, the perimeter transformer 414 can interact with the highway transformer 412 to create perimeter highways for the region of interest enabling the collection of items in transit to centralized travel lane highways configured to redistribute the items to associated item destinations.

In some embodiments, an expansion joint transformer 416 can operate to configure expansion joints between the region of interest and other storage regions are configured with item transfer capabilities. In particular, the expansion joint transformer 416 can configure travel lanes in the region of interest to align with and interact with travel lanes in bordering storage regions. Additionally, the expansion joint transformer 416 can configure travel lanes to utilize gate and doors in structural features of the logistics facility, utilize conveyor belts to transfer items between storage zones, and other compatibility operations that ensure that regions of the logistics facility effectively interact during operations.

In some embodiments, a map validation system 420 can receive a candidate map 418 from the map transformer 408 and determine whether any additional modifications are to be applied to the candidate map 418. As discussed above, with respect to FIG. 1, the map validation system 420 can identify any errors or abnormalities created during production of the candidate map 418. For example, travel cells (i.e., individual sections of travel lanes) that are not adjacent to two additional travel cells can be identified as dead ends and removed from the candidate maps 418. Additionally, travel cells that operate in opposite directions without an associated input or output travel cell at the junction of the travel cells operating in opposite directions can be corrected by the map validation system 420.

Figure 5:
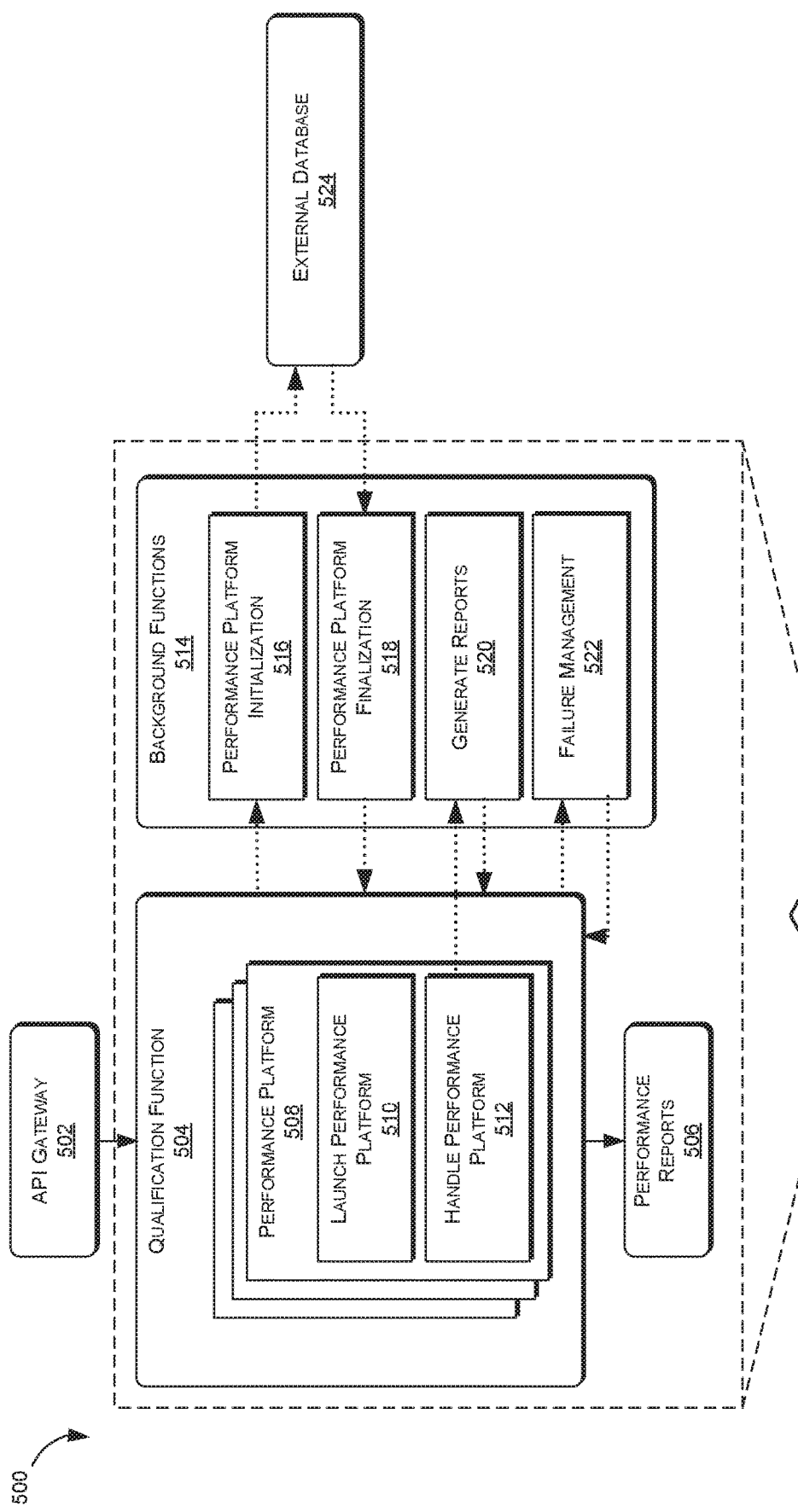
FIG. 5 illustrates an example computing environment representing a map qualification system that receives one or more candidate maps from a map generator and that simulates operations of a logistics facility within the candidate map to determine whether one or more objectives are satisfied by the candidate map.

FIG. 5 illustrates an example computing environment representing a map qualification system 500 that receives one or more candidate maps from a map generator and simulates operations of a logistics facility within the candidate map to determine whether one or more objectives are satisfied by the candidate map. In particular, an API gateway 502 can receive the candidate map and an indication of the one or more objectives. The candidate map and the one or more objectives can be passed to a qualification function 504 configured to produce one or more performance reports 506. Additionally, the qualification function 504 can create a performance platform 508 through a launch performance platform function 510 and operate a simulation of the candidate map via a handle performance platform function 512. Additionally, the qualification function 504 can utilize one or more background functions including a performance platform initialization function 516, a performance platform finalization function 518, a generate reports function 520, and a failure management function 522.

In some embodiments, the API gateway 502 provides a map generator the capability to transmit the candidate map and one or more objectives to the map qualification system 500. Alternatively, the API gateway 502 provides a user device the ability to transmit the candidate map and one or more objectives to the map qualification system 500. In general, the API gateway 502 provides an access portal for a logistics solution and one or more logistics objectives to be provided to the map qualification system 500 for simulation to determine whether the logistics solution satisfies the one or more logistics objectives.

In some embodiments, a qualification function 504 can receive the candidate map and the one or more objectives associated with the candidate map. The qualification function 504 can call a background function 514 to initialize the performance platform 508 that simulates logistics operations within the candidate map produced by the map generator. In particular, a performance platform initialization function 516 can be called to generate the performance platform 508. To generate the performance platform 508, the qualification function 504 can pass the candidate map to the performance platform initialization function 516. The performance platform initialization function 516 can be a function configured to initialize a virtual logistics environment based at least on the candidate map provided to the map qualification system 500 and create a grid of cells within the virtual logistics environment 516. Further, the performance platform 508 can be finalized by a performance platform finalization function 518 that populates the virtual logistics environment with simulations of the storage locations, travel lanes, robotic drives, items, item destinations, item sources, and other features that populate the virtual logistics environment. The simulations of the features that populate the virtual logistics environment can be determined based on labels provided by the candidate map identifying the associated physical features described by the candidate map. In at least on embodiment, the virtual features can be extracted from an internal database and/or an external database 524 that describes the operations performed by the virtual features.

In some embodiments, the performance platform initialization function 516 and the performance platform finalization function 518 can pass the virtual logistics environment to the qualification function 504. In particular, the qualification function 504 can create the performance platform 508 via a launch performance platform function 510. Additionally, in creating the performance platform 508, the launch performance platform function 510 can initiate simulation of the candidate map within the virtual logistics environment created by the background functions 514. Further, a handle performance platform function 512 can be initiated with the simulation of the candidate map to monitor the performance of the candidate map within the simulation and track performance indicators for the candidate map. The handle performance platform function 512 can pass performance indicators to a generate reports function 520 that determines whether the candidate map satisfies associated performance objectives and determines performance costs, if any, that are associated with the implementation of the candidate map (i.e., an increase in storage density targeted by the performance objectives can be associated with a slight increase in an average amount of time required to place an item within storage and/or extract an item from storage). It should be noted that the performance objectives can also include a limit to performance costs associated with a performance benefit (i.e., objective is to increase storage density by a percentage while not increasing average to place and/or extract items to and from storage locations) Accordingly, one or more performance reports 506 regarding the candidate map can indicate whether the candidate map satisfies the performance objectives, performance costs associated with implementing the candidate map, and whether the candidate map is a qualified map to be output by the map qualification system 500.

In some embodiments, the performance platform 508 can be the simulation engine that utilizes the virtual logistics environment produced by the performance platform initialization function 516, the performance platform finalization function 518, and, optionally, the internal/external database 524 that houses virtual features configured to operate within the simulated environment. In particular, the initialization function 516 can form the framework for the performance platform 508 by establishing a grid of cells comprised of storage locations, travel lanes, and/or fiducials that can be characterized to perform various operations. Additionally, the finalization function 518 can characterize the individual cells of the grid with operations obtained from the internal/external database 524. For example, the candidate map can indicate that a cell comprises a five storage location by five storage location area, bounded on a north side, a west side, and a south side by transport lanes. Further, the cell from the candidate map can describe storage locations and obstacles within the five storage location by five storage location area, modify how the transport lanes can interact with the five slot by five slot area, and describes additional interactions between the cell and bordering cells (i.e., direction of transport lanes feeding connected transport lanes or indicate what cells share transport lanes). Accordingly, the finalization function can determine interaction functions to be assigned to the cell based on the described features such that the cell can be accurately simulated within the performance platform 508.

In some additional embodiments, performance platform 508 can be configured to simulate the virtual logistics environment provided by the background functions 514 under various scenarios. In particular, the qualification function 504 can be configured to include a plurality of logistics scenarios that include calls for items throughout the candidate map (i.e., the virtual logistics environment), item throughput testing, item storage capacity testing, and other performance tests for the candidate map (i.e., large volume item requests from a single storage region, redirection of items, etc.). The various logistics scenarios enable the handle performance platform function 512 to monitor distribution and extraction times for items within the candidate map, storage density, average travel distance, expected loss (i.e., spills and/or damaged items from travel lane turns and/or transfers), wireless access point coverage for robotic drives, and other performance indicators related to the one or more objectives associated with the candidate map. Accordingly, the handle performance platform function 512 can report the performance indicators to the generate reports function 520 such that the qualification function 504 can receive a performance report indicating increases/decreases in the performance indicators indicating benefits and costs associated with the candidate map. Further, the qualification function 504 can determine whether the candidate map can be categorized as a qualified map based on the performance indicators in the performance report 506 satisfying the one or more objectives.

In some further embodiments, the qualification function 504 can be configured to detect errors in the simulation of the candidate map. In particular, failure to execute distribution commands, extraction commands, transfer commands, and other functions of the performance platform 508 can indicate a failure that is transmitted to a failure management function 522 that analyzes the performance platform 508 to identify the failure and the associated cells/cell configuration to identify the cell configuration that caused the error. The failure management function 522 can further report the cause of failure to the generate reports function 520 and/or issue an independent failure report that can be issued as an additional performance report 506.

In some embodiments, the map qualification system 500 can generate and transmit a feedback report to the map generator. In particular, the qualification function 504 can analyze the performance indicators generated by the performance platform 508 and the one or more performance reports 506 generated by the generate report function 520 and the failure management function 522 to determine the feedback report. Additionally, the feedback report can indicate whether the candidate map satisfied the one or more objectives or indicate that the candidate map failed to satisfy the one or more objectives. Accordingly, the map qualification system 500 can cause the map generator to determine additional sets of input parameters based on the original input parameters used to generate the candidate map associated with the feedback report.

In some additional reports, the map qualification system 500 can generate and output training data sets associated with simulated candidate maps. In particular, the training data sets can include indications of cell performance, wherein the indications of cell performance include detailed outputs regarding congestion of travel lanes, time spent completing dig operations, distribution/extraction times from the associated cells. Additionally, the training data sets can be provided to an algorithm that analyzes the training data sets in association with the connected candidate map. Accordingly, the algorithm can be trained to receive the training data set, analyze the training data in combination with the candidate map, and determine correlations between map structures, input parameters, performance indicators results, and whether the candidate map satisfied the one or more objectives to determine associations between input parameters and objective satisfaction results. Further, the associations determined by the algorithm can be utilized to refine the generation of input parameters and/or analyze initial candidate maps to determine whether the initial candidate maps would satisfy the one or more associated objectives to refine the input parameters without expending the resources and simulation time to perform extensive map qualification.

Figure 6:
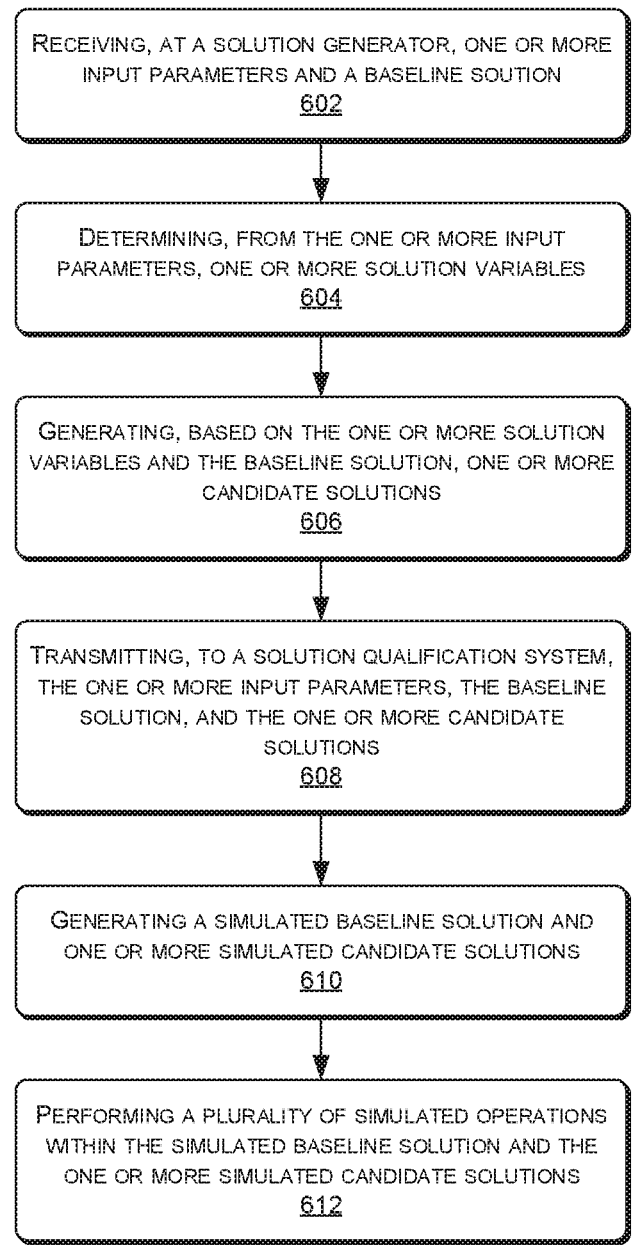
FIG. 6 illustrates an example flow diagram that describes the generation of one or more candidate solutions based on one or more input parameters and a baseline solution that are simulated by a solution qualification system to determine whether one or more performance objectives are met.

FIG. 6 illustrates an example flow diagram that describes the generation of one or more candidate solutions based on one or more input parameters and a baseline solution. Additionally, the candidate solutions can be simulated to determine whether one or more performance objectives are met.

At block 602, a solution generator (i.e., a map generator as described above) can receive one or more input parameters and a baseline solution. In particular, the solution generator can receive one or more input parameters that can include performance objectives that are to be satisfied by generated candidate solutions. Additionally, the baseline solution can represent a current logistics facility operation that is to be modified by the generated candidate solutions. While the above discussion has largely focused on the optimization of storage locations and travel lanes within a logistics facility, the baseline solution can represent numerous additional logistics operations. For example, the baseline solution can represent arrival and departure schedules associated with a delivery depot that requires sufficiently allocated time and resources to effectively load and/or unload delivery vehicles within load/unloading zones at the delivery depot. Alternatively, the baseline solution can represent an integrated robotic distribution system utilizing robot arms and intelligent conveyance systems to effectively sort and direct items to desired destinations. Additionally, the baseline solution can represent item routing infrastructure that receives items extracted from the storage location and routes the items to various portions of the logistics facility such that the items can be delivered to their ultimate destination. Accordingly, the input parameters can be tailored to cause the solution generator to modify the baseline solution to improve an associated logistics operation.

At block 604, the solution generator can analyze the one or more input parameters to determine one or more solution variables. In particular, the one or more input parameters can include solution variables specifying qualities of the baseline solution that are to be modified, modification strategies for producing candidate solutions (i.e., particle swarm optimization, cluster width modification, least visited segment optimization, etc.), limits on the utilization of solution components or features (i.e., limiting the number of travel lane placed within a zone of interest, the number of delivery vehicles permitted in a travel lane or loading/unloading bay, etc.). Further, the one or more input parameters can include resource availability in association with the baseline solution. It should be noted that the solution generator can be configured to identify solution variables that influence the generation of candidate solutions from the baseline solution and identify input parameters to be provided to a solution qualification system such as resource availability for a logistics facility.

At block 606, the solution generator can produce one or more candidate solutions by modifying, redesigning, or creating a new design based on information obtained from the baseline solution and the solution variables determined from the input parameters. In particular, FIGS. 1 and 4 describe the modification of a baseline map of a logistics facility to create one or more candidate maps that can optimize the placement of travel lane, storage locations, and other features of the logistics facility. However, the solution generator can determine scheduling for unloading and loading delivery vehicles, managing movement of automated vehicles (i.e., robotic drives) through a mapped network of travel lanes, managing arrival and departure schedules for delivery vehicles, and managing the assignment of resources to tasks associated with logistics operations. For example, the solution generator can be configured to design and/or modify item routing/sorting infrastructure for a logistics facility. The solution generator can be configured to virtually map between item deposit locations (i.e., locations where items extracted from storage locations by robotic drives can be deposited) and collection locations that are associated with specific delivery locations and/or delivery regions (i.e., a zip code, town, city, building, etc. associated with delivery). Additionally, the item deposit locations and the collection locations can be connected and route items through tubes, chutes, conveyors, and/or other connections. Further, the solution generator can be configured to group item deposit locations, within the logistics facility, based on the delivery locations and/or delivery regions that the item deposit locations are associated with. Alternatively, item deposit locations can be placed and configured to route items to the collection locations based at least on the storage locations within the logistics facility (i.e., item deposit locations can be routed to various collection locations based on placement of the item deposit locations within a deep storage region or a high throughput region). Accordingly, the solution generator can be provided input parameters that enable the placement of logistics facility features for the candidate maps.

At block 608, the baseline solution, the one or more candidate solutions, and the one or more of input parameters can be transmitted to a solution qualification system in a manner described with respect to FIGS. 1-5.

At block 610, the solution qualification system can generate a simulated baseline solution and one or more simulated candidate solution as described with respect to FIG. 5. In particular, the simulated baseline solution can be constructed to represent a virtual environment configured to execute logistics operations associated with the baseline solution. Individual processes, such as the unloading of delivery vehicles, routing of autonomous vehicle through mapped travel paths, placement of items by robotics arms to enable intelligent routing of items by a conveyance system, and other processes can be implemented within the virtual environment. Additionally, the individual processes can be associated with resource costs indicating robotic drives, locations within the logistics facility, employees, and other finite resources that are occupied and/or consumed by the individual processes of the logistics operations. Further, the solution qualification system can simulate variable operation volume for the logistics facility as a whole and for individual regions/operations of the logistics facility. For example, the solution qualification system can simulate the routing of items between item deposit locations and collection locations that are associated with delivery locations and/or delivery regions. By simulating travel times, extract times, and deposit times for extract operations performed by robotic drives, the solution qualification system can track the performance of the logistics facility and identify benefits and costs associated with the placement of the deposit locations, the routing between deposit locations and collection locations, and organization of collection locations according to delivery location/region.

At block 612, the solution qualification system can execute the plurality of simulated operations within the simulated baseline solution and the one or more simulated candidate solutions. In particular, the solution qualification system can execute a series of operations and track the simulated consumption of resources over time. The solution qualification system can monitor resources to identify performance indicators such as storage density, average time to complete various operations and processes, waste and damage of items within the logistics facility, wireless access point alignment, and related indicators of solution performance. Accordingly, the solution qualification system can generate performance reports that indicate how the one or more candidate solutions performance indicators compare to the baseline line solution performance indicators in summary, over time, and at maximum and minimum operation capacity.

Figure 7:
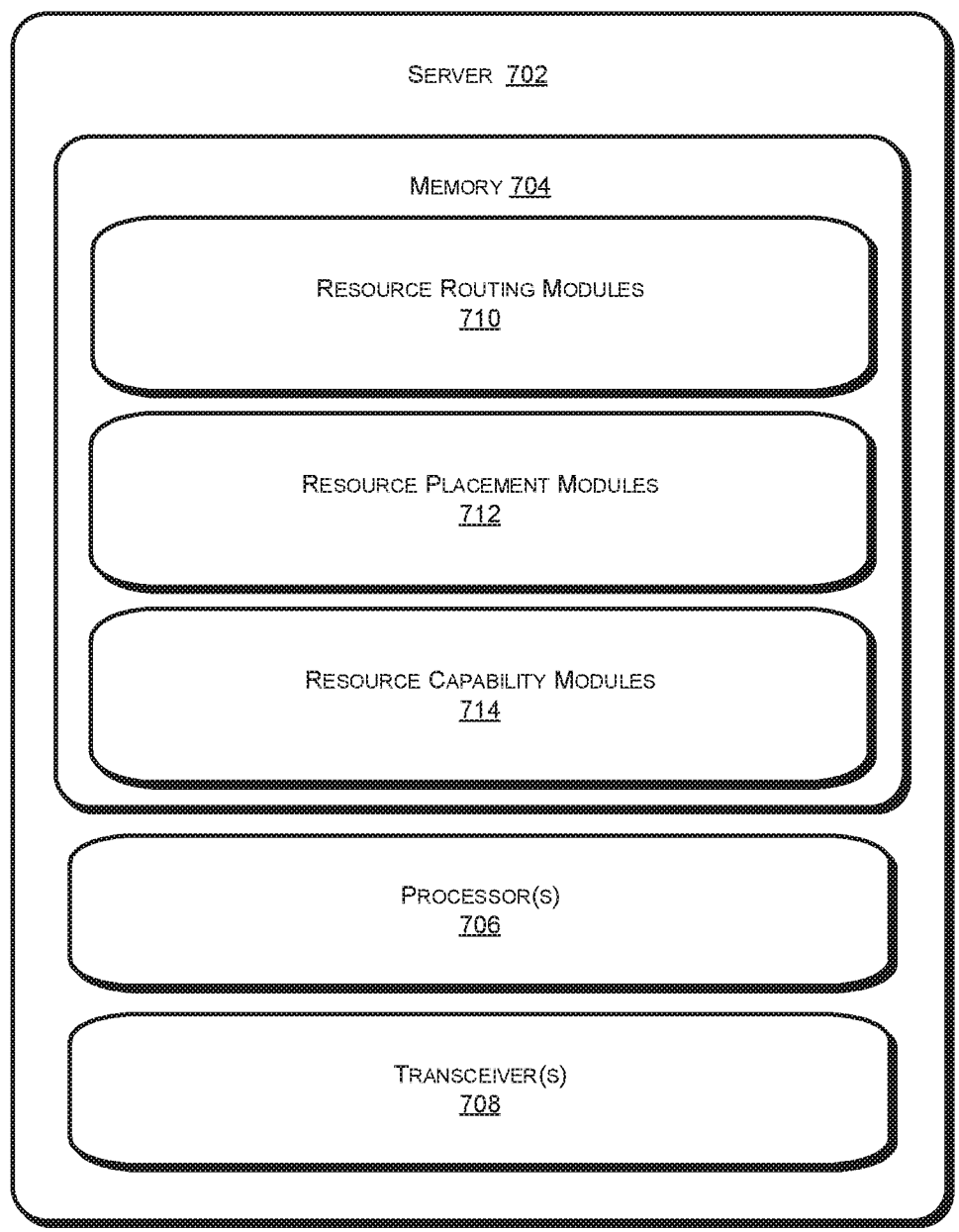
FIG. 7 illustrates a block diagram of a device that generates and analyzes one or more optimized solutions that modify a baseline solution currently implemented at a logistics facility.

FIG. 7 illustrates a block diagram of a device that generates and analyzes one or more optimized solutions that modify a baseline solution currently implemented at a logistics facility. In some embodiments, system 702 can interact with or correspond to any of the systems and/or implement the methods discussed in FIGS. 1-6. As illustrated, system 702 is generally comprised of memory 704, one or more processors 706, and one or more transceivers 708.

In some embodiments, memory 704 can be volatile (such as RAM), non-volatile (such as ROM, flash memory, etc.) or some combination of the two. The memory 704 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the system 702 accesses during execution of the above methods and/or operation of the above systems. The memory 704 can comprise one or more modules that cause the processors to execute one or more instructions and perform the operations discussed above with response to FIGS. 1-6. Further, the memory 704 can comprise additional modules that can be executed by the processors 706 and cause the processors 706 to perform additional operations associated with the system 702. The additional modules can comprise resource routing modules 710, resource placement modules 712, and resource capacity modules 714.

In some embodiments, the processors 706 can include one or more central processing units (CPUs), one or more graphics processing units (GPUs), both CPUs and GPUs, or other processing units or components known in the art.

In some embodiments, the transceivers 708 can include one or more wired or wireless transceivers. For instance, the transceivers 708 can include a network interface card, a network adapter, a LAN adapter, an address associated with a network connection, or another device permitting communications to be sent and received. Additionally, the transceivers 708 can comprise any wireless transceiver capable of engaging in wireless, radio frequency (RF) communication. Further, the transceivers 708 can also include other wireless modems, such as Wi-Fi, WiMAX, Bluetooth, and/or infrared communication modems. Accordingly, the one or more transceivers 708 can be configured to transmit input parameters, feedback reports, the baseline solution, and the one or more candidate solutions between a user device and the solution generation and qualification system.

In some embodiments, and as noted above, the memory 704 includes resource routing modules 710. In particular, the resource routing modules 710 operate to determine operational workflows within the logistics environment, whether physical or virtual (i.e., simulated). In particular, the resource routing modules 710 can be configured to determine how items are transported within a logistics facility and determine how workflows are accomplished within the baseline solution or the one or more candidate solutions. The resource routing module can be utilized, when simulating the baseline solution and/or the one or more candidate solutions, the order and interaction of operations within a workflow (i.e., prioritizing unloading a refrigeration truck, routing distribution of items within a warehouse via travel lane highways, etc.). Accordingly, the resource routing modules 710 can be configured to determine the methodology of workflows and to describe the movement of items and resources within a logistics operation.

In some embodiments, memory 704 includes resource placement modules 712 that operate to determine how facility components described by the resource routing modules 710 can be connected within a logistics facility. In particular, the resource placement modules 712 can define rules for the placement of resources (i.e., travel lanes, storage locations, moveable obstacles (i.e., robot drive charging stations, employee workspace, etc.) when modifying the baseline solution to create the one or more candidate solutions. Additionally, the resource placement modules 712 can utilize variable rule sets based on input parameters associated with individual candidate solutions. Accordingly, the resource placement modules can be utilized to describe how items and resources are located within the baseline solution and the one or more candidate solutions associated within the logistics operations.

In some embodiments, memory 704 includes resource capability modules 714 that determine flow rates, transfer times, travel times, error rates, and other features associated with operation of workflows and processes within a logistics facility. In particular, the resource capability modules 714 can define resource costs associated with the operation of workflow and processes such as available travel lanes, travel cells occupied by robotic drives, available robotic drives for item transport, item source locations, item destination locations, a number of available storage locations, a number of stored items, robot drive locations, robot drive charging locations, and other resources utilized by the logistics facility. Additionally, the resource capability modules 714 can define expected amounts of time that the operations and workflows take. Further, where the resource capability modules are utilized to simulate baseline and candidate solutions, the operations and workflows can be associated with ranges of time utilized to complete an operation and ranges of resources consumed by the operation to simulate the variable nature of real-world operations.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
one or more processors;
a memory storing one or more instructions that are executable by the one or more processors to perform operations comprising:
receiving a baseline map of a material handling facility, the baseline map indicating one or more structural features associated with the material handling facility and an existing storage organization of the material handling facility;
determining a set of input parameters associated with the baseline map, the set of input parameters including a storage density objective, the storage density objective indicating a storage location threshold greater than a number of storage locations associated with the existing storage organization;
identifying, based on the baseline map, a region of interest within the material handling facility;
determining, based on the baseline map, a grid associated with the material handling facility, of the grid including labels indicating positions of the one or more structural features of the material handling facility;
determining, based on the set of input parameters, a plurality of travel lanes that are applied to the grid;
determining, based on the set of input parameters, a plurality of storage locations that are applied to the grid;
generating, based on the grid, a candidate map of the material handling facility, the candidate map depicting the one or more structural features of the material handling facility and an updated storage organization that includes the plurality of travel lanes and the plurality of storage locations;
simulating, based on the candidate map, one or more logistics operations within the material handling facility, the one or more logistics operations comprising item distribution to the plurality of storage locations, item extraction from the plurality of storage locations, and item distribution between the plurality of storage locations via the plurality of travel lanes; and
determining, based on simulating the candidate map, whether the candidate map satisfies the storage density objective.

2. The system as recited in claim 1, wherein the operations further comprise:
simulating, based on the baseline map, one or more additional logistics operations within the material handling facility; and
determining, based on simulating the baseline map, a baseline storage density and an average baseline throughput time for items.

3. The system as recited in claim 2, wherein:
the storage density objective comprises a first determination that the candidate map has a storage density greater than the baseline storage density; and
the set of input parameters further comprises a throughput objective, the throughput objective comprising a second determination that the candidate map has an average throughput time for the items equal to or greater than the average baseline throughput time for the items.

4. The system as recited in claim 1, wherein the set of input parameters further comprises at least one of:
one or more grid offsets;
a maximum cluster width;
a maximum number of travel lanes;
a travel lane placement strategy;
one or more storage region perimeters;
one or more additional travel lanes to be preserved between the baseline map and the candidate map; or
a maximum number of obstacles in a path of the travel lanes.

5. The system as recited in claim 1, wherein:
the grid includes a first plurality of travel lanes that divide a first plurality of storage locations into one or more first clusters, the one or more first clusters having a first maximum cluster width of four storage locations;

the plurality of travel lanes is a second plurality of travel lanes that divide a second plurality of storage locations into one or more second clusters that have a second maximum cluster width of five storage locations; and the set of input parameters include the second maximum cluster width and causes the second plurality of travel lanes to be applied to the grid to form the one or more second clusters.

6. A method comprising:

receiving a set of input parameters and a baseline solution associated with the set of input parameters;

determining, based at least in part on the set of input parameters, one or more solution variables configured to modify the baseline solution;

determining, based at least in part on the solution variables and the baseline solution, one or more candidate solutions;

generating, based at least in part on the baseline solution, a simulated baseline solution configured to perform one or more operations associated with the baseline solution;

generating, based at least in part on the one or more candidate solutions, one or more simulated candidate solutions configured to perform the one or more operations; and determining, based at least on the one or more operations performed by the simulated baseline solution and the one or more simulated candidate solutions, that a candidate solution of the one or more candidate solutions satisfies one or more performance objectives.

7. The method of claim 6, wherein determining that the candidate solution satisfies the one or more performance objectives further comprises:

determining one or more baseline performance indicators associated with the simulated baseline solution and one or more candidate performance indicators associated with the one or more simulated candidate solutions;

determining, based at least in part on the set of input parameters, the one or more performance objectives associated with the one or more candidate solutions; and determining whether the one or more candidate performance indicators surpass the one or more baseline performance indicators.

8. The method of claim 6, further comprising:

generating, based at least in part on determining that the one or more candidate solutions satisfy the one or more performance objectives, one or more feedback reports that indicate the one or more solution variables associated with a simulated candidate solution associated with the candidate solution.

9. The method of claim 8, further comprising:

determining, based at least in part on the one or more feedback reports and the one or more solution variables, one or more second solution variables associated with the candidate solution;

determining, based at least in part on the one or more second solution variables, one or more second candidate solutions;

generating, based at least on the one or more second candidate solutions, one or more second simulated candidate solutions configured to perform the one or more operations associated with the baseline solution; and determining, based at least in part on the one or more operations performed by the simulated baseline solution and the one or more second simulated candidate solutions, that a second candidate solution of the one or more candidate solutions satisfies the one or more performance objectives.

10. The method of claim 6, wherein the baseline solution and the one or more candidate solutions determine at least one of:

travel lane networks and storage locations within a material handling facility;

unloading and loading operation schedules for a distribution depot;

management of delivery vehicle arrival and departure schedules; or integration of robotic placement systems within a distribution network.

11. The method of claim 6, wherein:

the baseline solution is a baseline map that comprise one or more storage locations, one or more travel lanes, and one or more structural features associated with a logistics facility; and the one or more candidate solutions are one or more candidate maps that comprise one or more modified storage locations, one or more modified travel lanes, and the one or more structural features associated with the logistics facility.

12. The method of claim 11, wherein the set of input parameters further comprises at least one of:

one or more grid offsets;

a maximum cluster width;

a maximum number of travel lanes;

a travel lane placement strategy;

one or more storage region perimeters;

one or more additional travel lanes to be preserved between the baseline solution and the one or more candidate solutions; or a maximum number of obstacles in a path of the travel lanes.

13. A system comprising:

one or more processors; and a memory storing one or more instructions that are executable by the one or more processors to perform operations comprising:

receiving a baseline map, a candidate map, and one or more performance objectives;

determining, based at least in part on the baseline map, a first virtual environment that implements the baseline map;

determining, based at least in part on the candidate map, a second virtual environment that implements the candidate map;

determining one or more simulated processes configured to perform one or more operations associated with the baseline map;

determining, based at least in part on the one or more simulated processes, one or more first performance indicators associated with a first execution of the one or more operations within the first virtual environment;

determining, based at least in part on the one or more simulated processes, one or more second performance indicators associated with a second execution of the one or more operations within the second virtual environment; and determining, based at least in part on comparing the one or more first performance indicators and the one or more second performance indicators, whether the candidate map satisfies the one or more performance objectives.

14. The system as recited in claim 13, wherein the baseline map and the candidate map determine at least one of:
   travel lane networks and storage locations within a material handling facility;
   unloading and loading operation schedules for a distribution depot;
   management of delivery vehicle arrival and departure schedules; or
   integration of robotic placement systems within a distribution network.

15. The system as recited in claim 13, wherein the one or more operations comprise:
   a place operation to move a first item from an item source to a first storage location;
   an extract operation to move a second item from a second storage location to an item destination; and
   a dig operation to move remove one or more objects from an exposed storage location to access a buried storage location.

16. The system as recited in claim 13, wherein determining the one or more simulated processes configured to perform the one or more operations comprises:
   identifying the one or more operations;
   determining one or more execution steps for each of the one or more operations; and
   determining an execution time and one or more execution resources associated with the one or more execution steps.

17. The system as recited in claim 16, wherein determining the one or more execution steps comprises:
   transmitting, to a database, an indication of an operation of the one or more operations; and
   receiving, from the database, a virtual operation that simulates the one or more execution steps when called by the first virtual environment and the second virtual environment.

18. The system as recited in claim 13, the operations further comprising:
   determining, based at least in part on the baseline map, one or more virtual resources, the virtual resources comprising available travel lanes, available robotic drives, item sources, item destinations, a first number of available storage locations, a second number of stored items, and robot drive locations,
   wherein determining the one or more simulated processes further comprises determining a virtual resource cost associated with each of the one or more simulated processes.

19. The system as recited in claim 18, the operations further comprising:
   monitoring a first utilization of the one or more virtual resources during the first execution of the one or more simulated processes and one or more second utilizations of the one or more virtual resources during the second execution of the one or more simulated processes,
   wherein determining the one or more first performance indicators and the one or more second performance indicators is based at least in part on the first utilization and the one or more second utilizations.

20. The system as recited in claim 13, wherein the one or more first performance indicators and the one or more second performance indicators comprise at least one of:
   a storage density determined based at least in part on a number of items stored by the baseline map or the candidate map; and
   an average operation time determined based at least in part on an average time to complete each of the one or more simulated processes.

* * * * *